US012216424B2

(12) United States Patent
Kobayashi et al.

(10) Patent No.: US 12,216,424 B2
(45) Date of Patent: Feb. 4, 2025

(54) SHEET TYPE DISCRIMINATION DEVICE, SHEET TYPE DISCRIMINATION METHOD, AND SHEET TYPE DISCRIMINATION PROGRAM

(71) Applicant: KONICA MINOLTA, INC., Tokyo (JP)

(72) Inventors: Daisuke Kobayashi, Hino (JP); Shohei Dokiya, Hino (JP); Makoto Ooki, Toyohashi (JP); Takafumi Yuasa, Hachioji (JP); Takaki Uemura, Seto (JP); Masahiko Takahashi, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/227,017

(22) Filed: Jul. 27, 2023

(65) Prior Publication Data

US 2024/0069478 A1 Feb. 29, 2024

(30) Foreign Application Priority Data

Aug. 23, 2022 (JP) ................................ 2022-132537

(51) Int. Cl.
*G03G 15/00* (2006.01)

(52) U.S. Cl.
CPC ................................ *G03G 15/5029* (2013.01)

(58) Field of Classification Search
CPC .......... G03G 15/04045; G03G 15/5029; B41J 2/447
USPC .................................................. 399/45, 389
See application file for complete search history.

(56) References Cited

U.S. PATENT DOCUMENTS

2019/0235435 A1* 8/2019 Yamamura ............ G03G 15/70
2020/0122482 A1 4/2020 Asaoka

FOREIGN PATENT DOCUMENTS

JP 2005-335869 A 12/2005
JP 2020-064003 A 4/2020

* cited by examiner

*Primary Examiner* — Hoang X Ngo
(74) *Attorney, Agent, or Firm* — Squire Patton Boggs (US) LLP

(57) ABSTRACT

A sheet type discrimination device includes: a first light source unit that irradiates a sheet with light having a first wavelength and light having a second wavelength; a detection unit that detects light from the sheet and acquires a detection value based on the light; and a control unit that derives a determination result of a type of the sheet, wherein the first light source unit and the detection unit are located on a same side with respect to the sheet, the detection value includes: a first detection value; and a second detection value, and the control unit discriminates first-type recycled paper by first processing using the first detection value, and discriminates second-type recycled paper different from the first-type recycled paper by second processing using the second detection value.

13 Claims, 18 Drawing Sheets

SHEET TYPE DISCRIMINATION DEVICE, SHEET TYPE DISCRIMINATION METHOD, AND SHEET TYPE DISCRIMINATION PROGRAM

The entire disclosure of Japanese patent Application No. 2022-132537, filed on Aug. 23, 2022, is incorporated herein by reference in its entirety.

BACKGROUND

Technological Field

The present disclosure relates to a sheet type discrimination device, a sheet type discrimination method, and a sheet type discrimination program.

Description of the Related Art

Since a fixing condition of an image forming apparatus varies depending on a sheet type, setting according to the sheet type is required. Conventionally, a user inputs a sheet type to an operation panel. However, in recent years, a sheet type discrimination device that automatically discriminates a sheet type by using a sensor and changes setting is known. The sheet type discrimination device that automatically discriminates a sheet type discriminates the sheet type on the basis of light from a sheet when the sheet is irradiated with light.

JP 2020-64003 A discloses a method for discriminating recycled paper on the basis of an amount of reflected light when a sheet is irradiated with light having a certain wavelength.

JP 2005-335869 A discloses a method for accurately discriminating a type of a medium located on an uppermost side when a sheet type is discriminated by irradiating a stacked thin medium (sheet) with light.

The method disclosed in JP 2020-64003 A utilizes a property that an amount of reflected light of recycled paper is smaller than that in other sheet types. The reason why the amount of reflected light is smaller in recycled paper than that in other sheet types is that waste paper pulp contained in the recycled paper absorbs irradiation light. However, even with the method disclosed in JP 2020-64003 A, some recycled paper has been unable to be discriminated as recycled paper in some cases.

SUMMARY

An object of the present disclosure is to provide a technique capable of reliably discriminating recycled paper.

To achieve the abovementioned object, according to an aspect of the present invention, a sheet type discrimination device reflecting one aspect of the present invention comprises: a first light source unit that irradiates a sheet with light having a first wavelength and light having a second wavelength; a detection unit that detects light from the sheet and acquires a detection value based on the light; and a control unit that derives a determination result of a type of the sheet by using the detection value, wherein the first light source unit and the detection unit are located on a same side with respect to the sheet, the detection value includes: a first detection value based on light from the sheet when the sheet is irradiated with light having the first wavelength; and a second detection value based on light from the sheet when the sheet is irradiated with light having the second wavelength, and the control unit discriminates first-type recycled paper by first processing using the first detection value, and discriminates second-type recycled paper different from the first-type recycled paper by second processing using the second detection value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
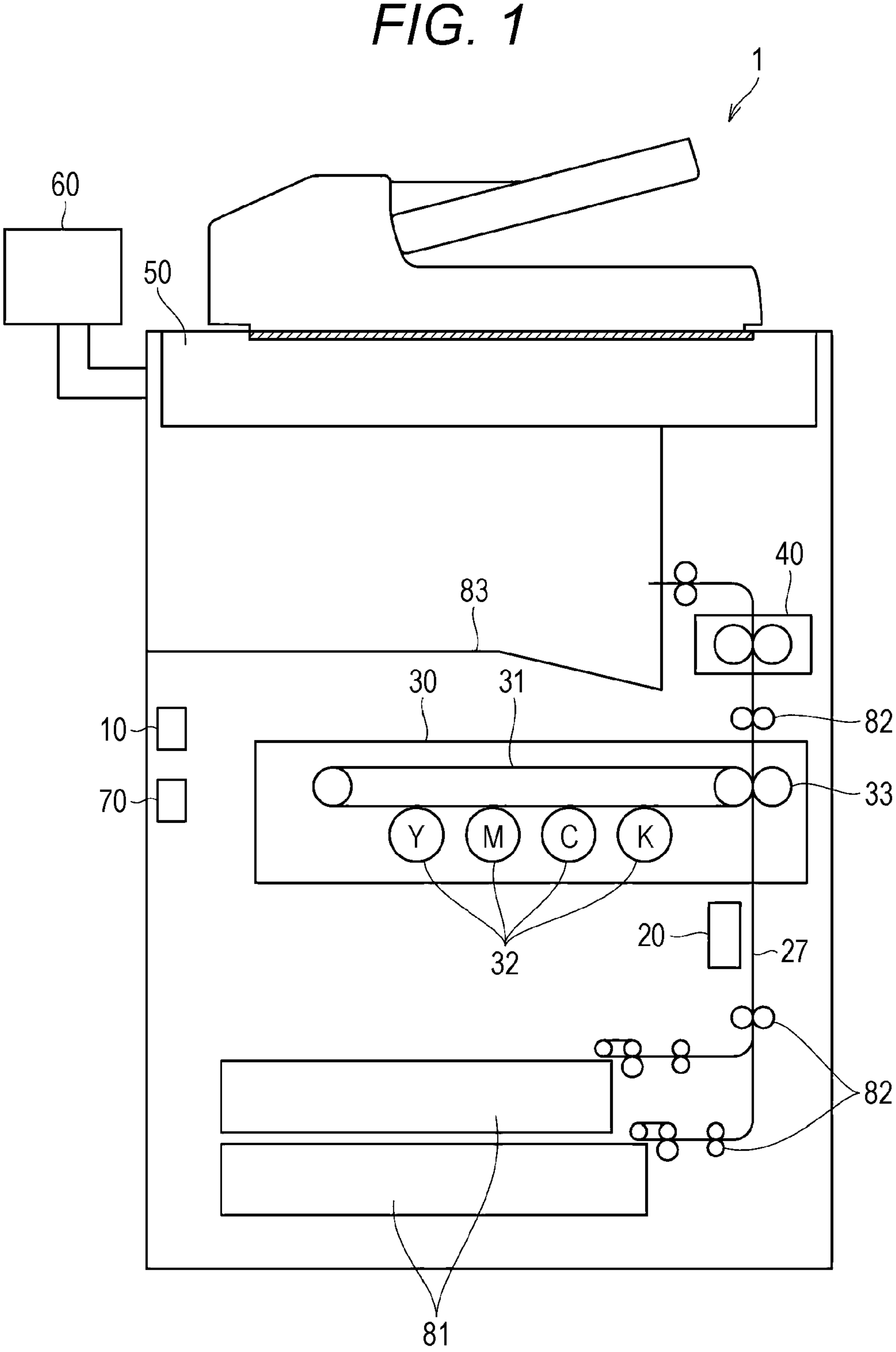
FIG. 1 is a view illustrating a schematic configuration of an image forming apparatus according to a first embodiment.

Hereinafter, one or more embodiments and modifications of the present invention will be described with reference to the drawings. However, the scope of the invention is not limited to the disclosed embodiments. In the following description, the same reference numerals are used for the same parts and components. Names and functions thereof are also the same. Therefore, a detailed description thereof will not be repeated. Note that embodiments and modifications described below may be selectively combined as appropriate.

First Embodiment

<A. Configuration of Image Forming Apparatus>

Figure 2:
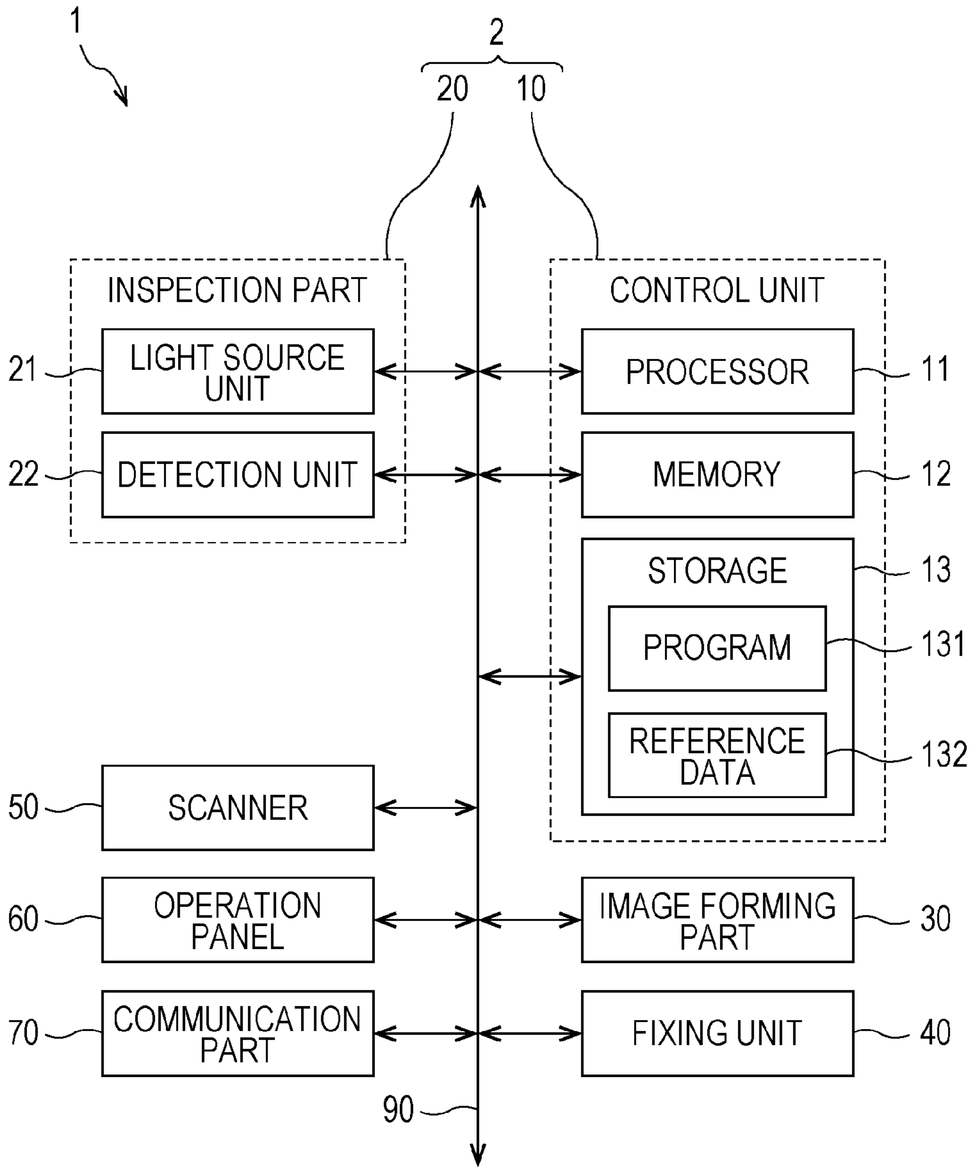
FIG. 2 is a diagram illustrating a hardware configuration of the image forming apparatus.

With reference to FIGS. 1 and 2, a configuration of an image forming apparatus according to a first embodiment will be described. FIG. 1 is a view illustrating a schematic configuration of the image forming apparatus according to the first embodiment. FIG. 2 is a diagram illustrating a hardware configuration of an image forming apparatus 1.

The image forming apparatus 1 is a multifunction peripheral (MFP) that forms an image on a sheet by an electrophotographic method. The image forming apparatus 1 includes a control unit 10, an inspection part 20, an image forming part 30, a fixing unit 40, a scanner 50, an operation panel 60, a communication part 70, a sheet feeding tray 81, a conveyance roller 82, a sheet discharging tray 83, a conveyance path 27, and a bus 90.

As illustrated in FIG. 2, the control unit 10 and the inspection part 20 constitute a sheet type discrimination device 2 that discriminates a sheet type. The control unit 10, the inspection part 20, the image forming part 30, the fixing unit 40, the scanner 50, the operation panel 60, and the communication part 70 are connected by the bus 90.

The control unit 10 includes a processor 11, a memory 12, and a storage 13. The processor 11 includes, for example, a central processing unit (CPU), a micro-processing unit (MPU), and the like. The memory 12 includes a volatile storage device such as a dynamic random access memory (DRAM) or a static random access memory (SRAM). The storage 13 includes, for example, a non-volatile storage device such as a hard disk drive (HDD), a solid state drive (SSD), or a flash memory.

The storage 13 stores a program 131 and reference data 132 that is referred to in determination processing to be described later. The program 131 includes a computer-readable instruction for controlling the image forming apparatus 1. The processor 11 implements various types of processing according to the present embodiment by developing the program 131 stored in the storage 13 onto the memory 12 and executing the program.

The program 131 may be provided not as a single program but by being incorporated in a part of any program. In this case, the processing according to the present embodiment is implemented in cooperation with any program. Even such a program not including some modules does not depart from the gist of the image forming apparatus 1 according to the present embodiment. In addition, some or all of functions provided by the program 131 may be implemented by dedicated hardware.

In addition, the storage 13 stores at least one of image data received from an external device or image data generated by the scanner 50.

The control unit 10 controls each unit of the image forming apparatus 1 by the processor 11 executing the program 131. For example, the processor 11 operates the image forming part 30, the conveyance roller 82, and the fixing unit 40 on the basis of image data stored in the storage 13, to form an image on a sheet. Here, the processor 11 changes an operation of each unit (for example, the image forming part 30, the conveyance roller 82, and the fixing unit 40) related to image formation, in accordance with a sheet type discrimination result obtained by the sheet type discrimination device 2. As an example, a conveyance speed and a nipping pressure by the conveyance roller 82 are changed according to the sheet type. Furthermore, a heating temperature and an applied pressure by the fixing unit 40 are changed according to the sheet type.

The inspection part 20 is provided at a position along the conveyance path 27 on an upstream side of the image forming part 30 (between the sheet feeding tray 81 and the image forming part 30), in the conveyance path 27 of the sheet from the sheet feeding tray 81 to the sheet discharging tray 83. However, the position of the inspection part 20 is not limited thereto, and the inspection part 20 can be arranged at any position along the conveyance path 27.

The inspection part 20 includes a light source unit 21 and a detection unit 22. The light source unit 21 emits light toward the conveyance path 27 in accordance with an instruction from the processor 11. The detection unit 22 detects light from a sheet.

The image forming part 30 forms an image by applying toner (color material) to a sheet supplied from the sheet feeding tray 81. The image forming part 30 includes an intermediate transfer belt 31, an image forming unit 32, and a transfer roller 33. The intermediate transfer belt 31 is an endless belt-shaped member that is stretched around a plurality of rollers and circularly moves. The image forming unit 32 is arranged along the intermediate transfer belt 31, and forms toner images of respective colors of C (cyan), M (magenta), Y (yellow), and K (black) on the intermediate transfer belt 31 on the basis of image data indicating an image to be printed. When a sheet passes through a nip part between the intermediate transfer belt 31 and the transfer roller 33, the toner image is transferred onto the sheet to form an image. In the present embodiment, the image forming part 30 capable of forming a color image has been exemplified. However, without limiting to this, the image forming part 30 capable of forming a monochrome image may be used.

The fixing unit 40 heats and pressurizes the sheet on which the toner image has been transferred, to fix the toner image on the sheet. The fixing unit 40 includes a pair of rollers including a heating roller and a pressure roller that nip the sheet. The sheet on which the toner image has been fixed is conveyed by the conveyance roller 82 and discharged to the sheet discharging tray 83. A heating condition and a pressurizing condition by the fixing unit 40 are controlled by the processor 11 in accordance with a sheet type.

The scanner 50 includes an optical system such as a light source and a reflecting mirror, and an imaging element. The scanner 50 reads an image on a sheet conveyed on a predetermined conveyance path or a sheet placed on a platen glass, and generates image data in a bitmap format for each color of red (R), green (G), and blue (B). The generated image data is stored in the storage 13. By forming an image with the image forming part 30 on the basis of the image data, the read image can be copied to another sheet.

The operation panel 60 includes a display device such as a liquid crystal display, and an input device such as a touch panel arranged to overlap with a screen of the display device. The operation panel 60 displays various types of information such as an operation status and a processing result of the image forming apparatus 1 on a display device, converts a user's input operation on the input device into an operation signal, and outputs the operation signal to the processor 11.

The communication part 70 includes a network card or the like. The communication part 70 is connected to a communication network such as a local area network (LAN), and transmits and receives information to and from an external device on the communication network. The processor 11 communicates with the external device on the communication network via the communication part 70.

The sheet feeding tray 81 stores sheets before image formation. A plurality of types of sheets may be stored in the sheet feeding tray 81.

The types of sheets are characterized by at least one property among a material (raw material) of the sheet, a state of surface treatment, presence/absence and an amount of a phosphor, and a color. Therefore, sheets in which at least one of these properties is mutually different are different types of sheets. The types of sheets stored in the sheet feeding tray 81 include, for example, plain paper, coated paper, first-type recycled paper, and second-type recycled paper.

The plain paper is paper produced using pulp containing wood as a main raw material (that is, pulp that is not recycled from waste paper, usually chemical pulp). The coated paper is paper whose both surfaces are coated with a coating agent. The recycled paper is paper in which waste paper pulp taken out from waste paper is blended at a predetermined blending ratio or more. The waste paper pulp easily absorbs light having a peak wavelength of less than 550 nm (that is, light having a wavelength shorter than that of green color).

The first-type recycled paper is recycled paper that does not contain a large amount of phosphor, that is, recycled paper with a small amount of phosphor. The second-type recycled paper is recycled paper containing a large amount of phosphor, that is, recycled paper with a large amount of phosphor. The second-type recycled paper contains a larger amount of phosphor than the first-type recycled paper. Further, the second-type recycled paper contains a larger amount of phosphor than the coated paper. In general, a phosphor contained in a sheet absorbs ultraviolet light and emits light (fluorescence) having a longer wavelength than ultraviolet light.

The conveyance roller 82 rotates while nipping one sheet, to convey the sheet along the conveyance path 27. A conveyance timing and a conveyance speed by the conveyance roller 82 are controlled by the processor 11 in accordance with a type of the sheet. On the sheet discharging tray 83, a sheet on which an image is formed is placed.

<B. Configuration of Inspection Part>

Figure 3:
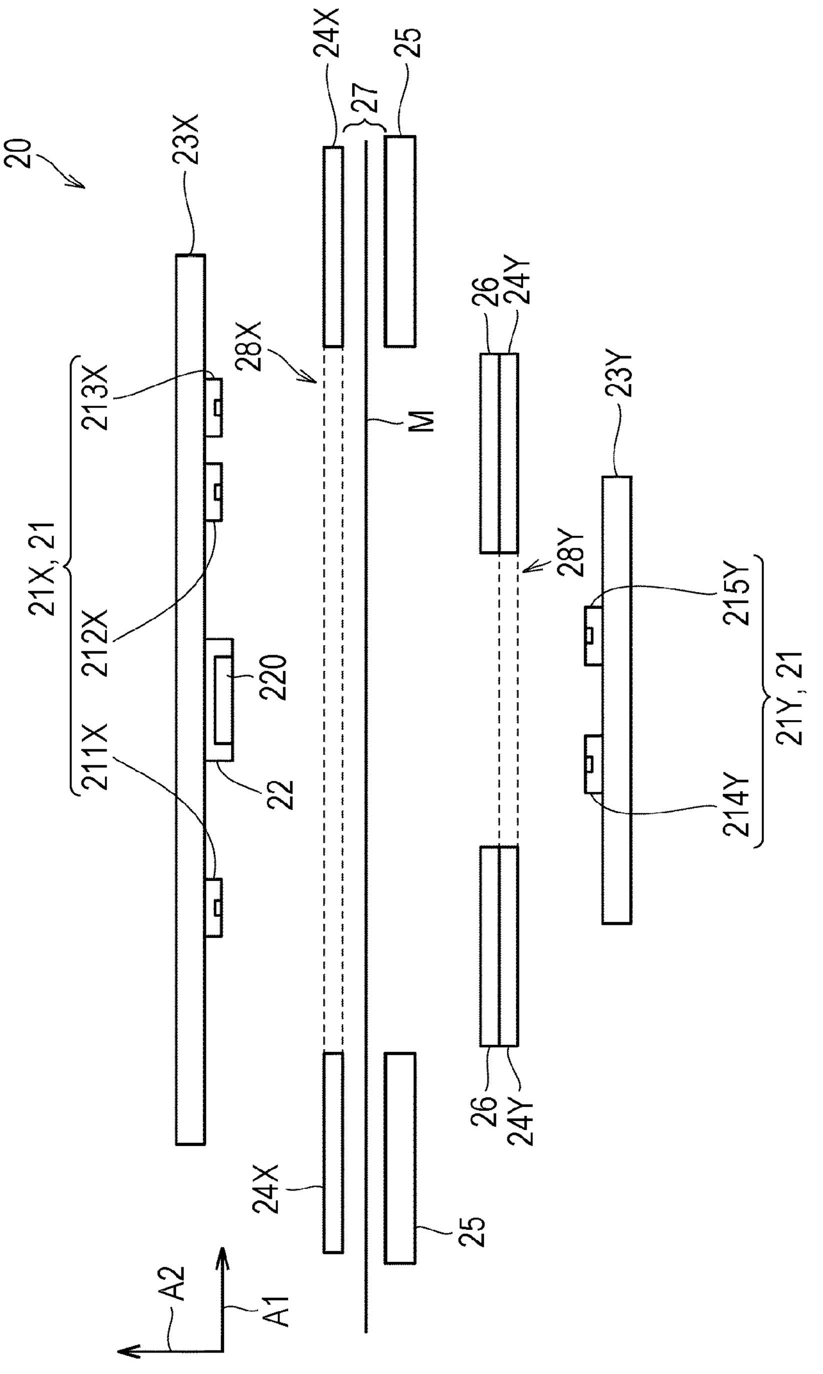
FIG. 3 is a view illustrating an example of a configuration of an inspection part.

A configuration of the inspection part 20 will be described with reference to FIG. 3. FIG. 3 is a view illustrating an example of a configuration of the inspection part 20.

Arrow A1 illustrated in FIG. 3 indicates a direction (hereinafter, referred to as a "conveyance direction") in which a sheet M is conveyed. Arrow A2 indicates a direction perpendicular to the conveyance direction.

The inspection part 20 includes the light source unit 21, the detection unit 22, element substrates 23X and 23Y, optical diaphragms 24X and 24Y, a sheet feeding guide 25, and a reflection part 26. The sheet M is conveyed along the conveyance path 27 provided between the optical diaphragm 24X and the sheet feeding guide 25. Since the conveyance path 27 has a width in the direction of Arrow A2, a passing position of the sheet M can fluctuate in the direction of Arrow A2 within a range of the width.

The light source unit 21 includes a first light source unit 21X and a second light source unit 21Y. The first light source unit 21X and the detection unit 22 are located on the same side with respect to the sheet M. The first light source unit 21X includes a first light emitting element 211X, a second light emitting element 212X, and a third light emitting element 213X. The first light emitting element 211X, the second light emitting element 212X, and the third light emitting element 213X are, for example, light-emitting diodes (LEDs). The first light emitting element 211X emits light having a first wavelength, the second light emitting element 212X emits light having a second wavelength, and the third light emitting element 213X emits light having a third wavelength.

The light having the first wavelength has a peak wavelength of 390 nm or more and less than 550 nm. More preferably, the light having the first wavelength is light having a peak wavelength of 390 nm or more and less than 440 nm (that is, ultraviolet light). The wavelength of 390 nm or more and less than 440 nm is a wavelength at which a phosphor contained in a sheet does not absorb much light, and is a wavelength at which waste paper pulp absorbs much light. As an example, in the present embodiment, light having a peak wavelength of 405 nm is adopted as the light having the first wavelength.

The light having the second wavelength is ultraviolet light. More preferably, the light having the second wavelength has a peak wavelength of 340 nm or more and less than 390 nm. The wavelength of 340 nm or more and less than 390 nm is a wavelength at which a phosphor contained in a sheet absorbs much light. As an example, in the present embodiment, light having a peak wavelength of 365 nm is adopted as the light having the second wavelength.

The light having the third wavelength is infrared light. As an example, in the present embodiment, light having a peak wavelength of 850 nm is adopted as the light having the third wavelength.

The second light source unit 21Y is located on a side opposite to the side on which the detection unit 22 is arranged with respect to the sheet M. That is, the second light source unit 21Y, the conveyance path 27, and the detection unit 22 are located in this order. The second light source unit 21Y includes a fourth light emitting element 214Y and a fifth light emitting element 215Y. The fourth light emitting element 214Y and the fifth light emitting element 215Y are LEDs. The fourth light emitting element 214Y emits light having a fourth wavelength, and the fifth light emitting element 215Y emits light having a fifth wavelength.

The light having the fourth wavelength is infrared light. As an example, in the present embodiment, light having a peak wavelength of 850 nm is adopted as the light having the fourth wavelength.

The light having the fifth wavelength is blue light. As an example, in the present embodiment, light having a peak wavelength of 460 nm is adopted as the light having the fifth wavelength.

While a sheet is passing through the inspection part 20, the processor 11 causes the first light emitting element 211X, the second light emitting element 212X, the third light emitting element 213X, the fourth light emitting element 214Y, and the fifth light emitting element 215Y to emit light such that light emission timings do not overlap with each other. When the first light emitting element 211X, the second light emitting element 212X, the third light emitting element 213X, the fourth light emitting element 214Y, and the fifth light emitting element 215Y each emit light, the sheet M conveyed on the conveyance path 27 is irradiated with light.

The detection unit 22 includes a light receiving element 220. The light receiving element 220 is, for example, a photodiode. In the photodiode, light having a longer wavelength is more easily detected. The light receiving element 220 detects incident light and outputs a photocurrent according to an amount of the incident light. The detection unit 22 converts the photocurrent output by the light receiving element 220 into a voltage, converts the voltage into digital data, and outputs the digital data to the processor 11.

The element substrates 23X and 23Y are provided at positions facing the sheet M being conveyed. On a surface of the element substrate 23X facing the sheet M, the first light emitting element 211X, the second light emitting element 212X, the third light emitting element 213X, and the light receiving element 220 are provided. On a surface of the element substrate 23Y facing the sheet M, the fourth light emitting element 214Y and the fifth light emitting element 215Y are provided.

The optical diaphragm 24X is located between the sheet feeding guide 25 and the element substrate 23X, and the optical diaphragm 24Y is located between the sheet feeding guide 25 and the element substrate 23Y. The optical diaphragm 24X has an opening 28X in a range including a portion facing the first light emitting element 211X, the second light emitting element 212X, the third light emitting element 213X, and the light receiving element 220. The optical diaphragm 24Y has an opening 28Y in a range including a portion facing the fourth light emitting element 214Y and the fifth light emitting element 215Y. Irradiation light from the first light source unit 21X is incident on the sheet M through the opening 28X, and irradiation light from the second light source unit 21Y is incident on the sheet M through the opening 28Y. Since a portion of the optical diaphragm 24X other than the opening 28X has a light shielding property, and a portion of the optical diaphragm 24Y other than the opening 28Y has a light shielding property, light other than the irradiation light is suppressed from being incident on the sheet M.

The sheet feeding guide 25 supports the sheet M such that the sheet M moves along the conveyance path 27.

The reflection part 26 is provided at a position facing the first light source unit 21X. The reflection part 26 reflects light emitted from the first light source unit 21X. The reflection part 26 is used to evaluate reflectivity of the sheet.

In the example illustrated in FIG. 3, the second light source unit 21Y includes the fourth light emitting element 214Y and the fifth light emitting element 215Y. However, in the first embodiment, the second light source unit 21Y is merely required to include the fourth light emitting element 214Y, and may not include the fifth light emitting element 215Y.

<C. Reflected Light and Reflectance>

Figure 4:
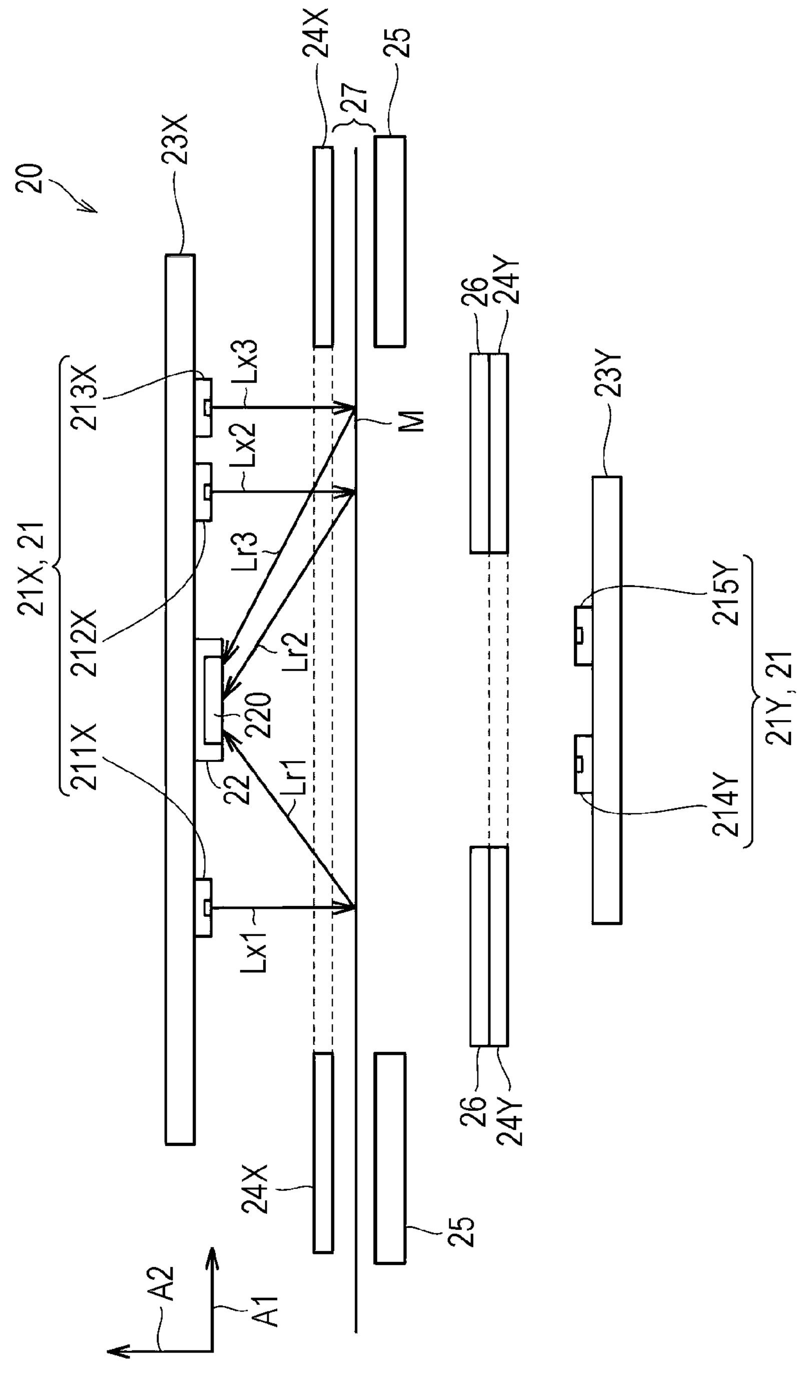
FIG. 4 is a view for explaining light detected by a light receiving element when light is emitted from a first light source unit at a timing when a sheet is passing through the inspection part.
Figure 5:
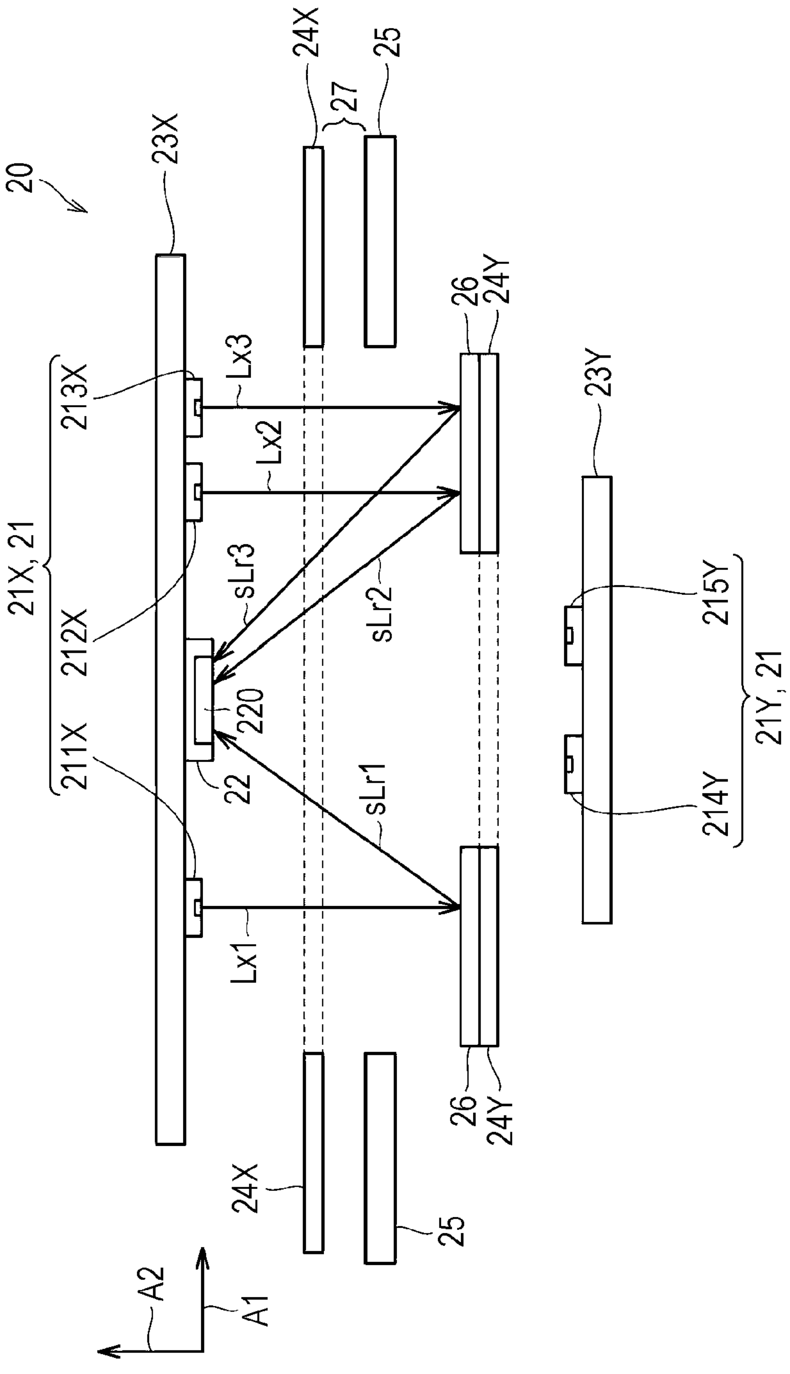
FIG. 5 is a view for explaining light detected by the light receiving element when light is emitted from the first light source unit at a timing when the sheet is not passing through the inspection part.

With reference to FIGS. 4 and 5, detection of reflected light and calculation of a reflectance will be described. The reflectance is an index used to evaluate reflectivity of a sheet.

FIG. 4 is a view for explaining light detected by the light receiving element 220 when light is emitted from the first light source unit 21X at a timing when the sheet M is passing through the inspection part 20.

When first irradiation light Lx1 having the first wavelength is emitted from the first light emitting element 211X at a timing when the sheet M is passing through the inspection part 20, the light receiving element 220 detects reflected light Lr1 as light from the sheet M. The reflected light Lr1 includes light reflected by the sheet M in the first irradiation light Lx1. When the sheet M contains a phosphor, the reflected light Lr1 further includes fluorescence emitted from the phosphor that has absorbed the first irradiation light Lx1.

When second irradiation light Lx2 having the second wavelength is emitted from the second light emitting element 212X at a timing when the sheet M is passing through the inspection part 20, the light receiving element 220 detects reflected light Lr2 as light from the sheet M. The reflected light Lr2 includes light reflected by the sheet M in the second irradiation light Lx2. When the sheet M contains a phosphor, the reflected light Lr2 further includes fluorescence emitted from the phosphor that has absorbed the second irradiation light Lx2.

When third irradiation light Lx3 having the third wavelength is emitted from the third light emitting element 213X at a timing when the sheet M is passing through the inspection part 20, the light receiving element 220 detects reflected light Lr3 as light from the sheet M. The reflected light Lr3 includes light reflected by the sheet M in the third irradiation light Lx3. When the sheet M contains a phosphor, the reflected light Lr3 further includes fluorescence emitted from the phosphor that has absorbed the third irradiation light Lx3.

The detection unit 22 acquires a light amount of each of the reflected light Lr1, the reflected light Lr2, and the reflected light Lr3, and outputs the light amount to the processor 11. The amount of the reflected light Lr1 acquired by the detection unit 22 is an example of a "first detection value" in the present disclosure. The amount of the reflected light Lr2 acquired by the detection unit 22 is an example of a "second detection value" in the present disclosure. The amount of the reflected light Lr3 acquired by the detection unit 22 is an example of a "third detection value" in the present disclosure.

FIG. 5 is a view for explaining light detected by the light receiving element 220 when light is emitted from the first light source unit 21X at a timing when the sheet M is not passing through the inspection part 20.

When the first irradiation light Lx1 having the first wavelength is emitted from the first light emitting element 211X at a timing when the sheet M is not passing through the inspection part 20, the light receiving element 220 detects reflected light sLr1 reflected by the reflection part 26.

When the second irradiation light Lx2 having the second wavelength is emitted from the second light emitting element 212X at a timing when the sheet M is not passing through the inspection part 20, the light receiving element 220 detects reflected light sLr2 reflected by the reflection part 26.

When the third irradiation light Lx3 having the third wavelength is emitted from the third light emitting element 213X at a timing when the sheet M is not passing through the inspection part 20, the light receiving element 220 detects reflected light sLr3 reflected by the reflection part 26.

The detection unit 22 acquires a light amount of each of the reflected light sLr1, the reflected light sLr2, and the reflected light sLr3, and outputs the light amount to the processor 11. The processor 11 stores the light amount of each of the reflected light sLr1, the reflected light sLr2, and the reflected light sLr3 into the storage 13. The light amount of each of the reflected light sLr1, the reflected light sLr2, and the reflected light sLr3 is an example of the reference data 132.

The reflectance in the present disclosure is calculated by the processor 11 by using the following Equation 1.

Reflectance=light amount Lr/light amount sLr (Equation 1)

The light amount Lr in Equation 1 indicates an amount of light detected by the light receiving element 220 when light is emitted from the first light source unit 21X at a timing when the sheet M is passing through the inspection part 20. Each of the light amount of the reflected light Lr1, the light amount of the reflected light Lr2, and the light amount of the reflected light Lr3 is an example of the light amount Lr.

The light amount sLr in Equation 1 indicates an amount of light detected by the light receiving element 220 when light is emitted from the first light source unit 21X at a timing when the sheet M is not passing through the inspection part 20. Each of the light amount of the reflected light sLr1, the light amount of the reflected light sLr2, and the light amount of the reflected light sLr3 is an example of the light amount sLr.

In the following description, a reflectance Vr of light having the first wavelength, a reflectance UVr of light having the second wavelength, and a reflectance IRr of light having the third wavelength are calculated by the processor 11 by using the following Equations 2 to 4.

Reflectance Vr of light having first wavelength=(amount of reflected light Lr1)/(amount of reflected light sLr1) (Equation 2)

Reflectance UVr of light having second wavelength=(amount of reflected light Lr2)/(amount of reflected light sLr2) (Equation 3)

Reflectance IRr of light having third wavelength=(amount of reflected light Lr3)/(amount of reflected light sLr3) (Equation 4)

<D. Transmitted Light and Transmittance>

Figure 6:
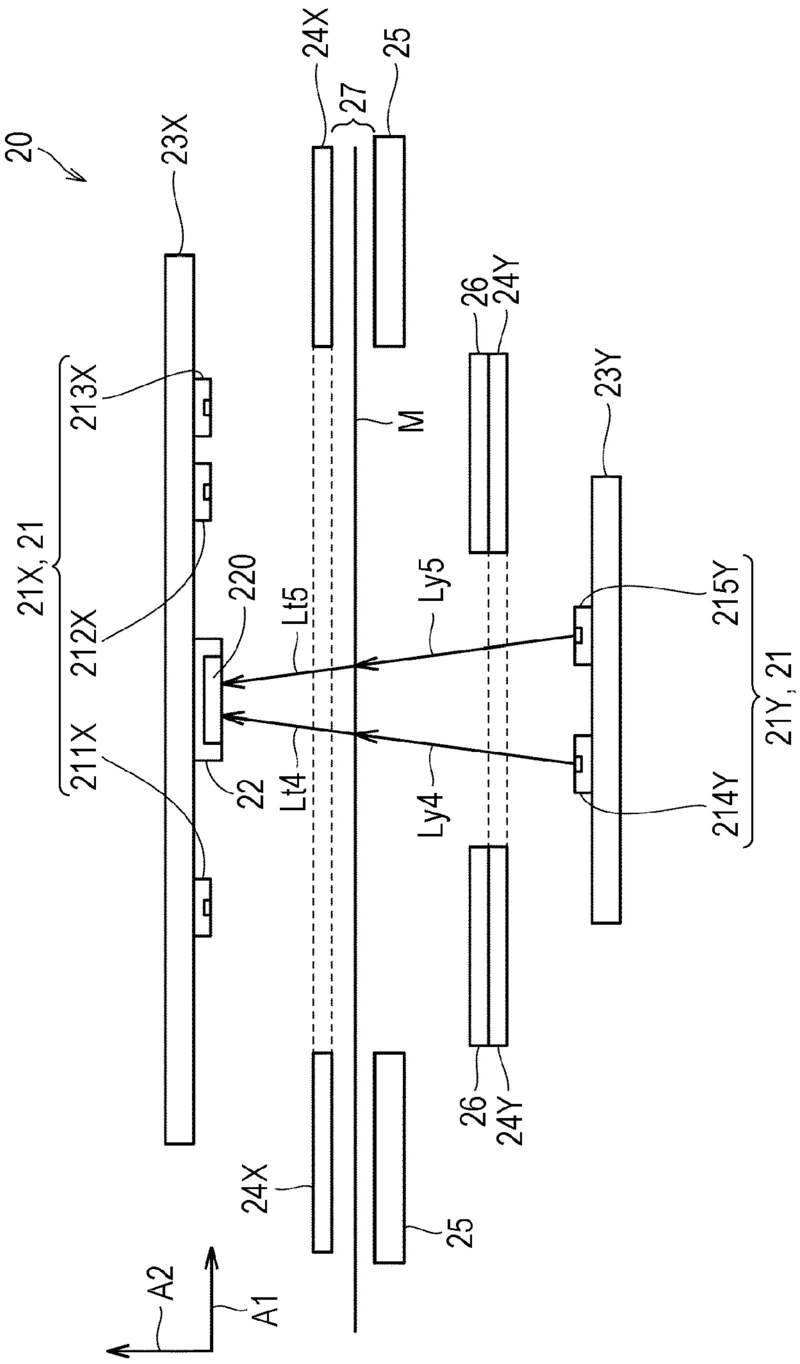
FIG. 6 is a view for explaining light detected by the light receiving element when light is emitted from a second light source unit at a timing when the sheet is passing through the inspection part.
Figure 7:
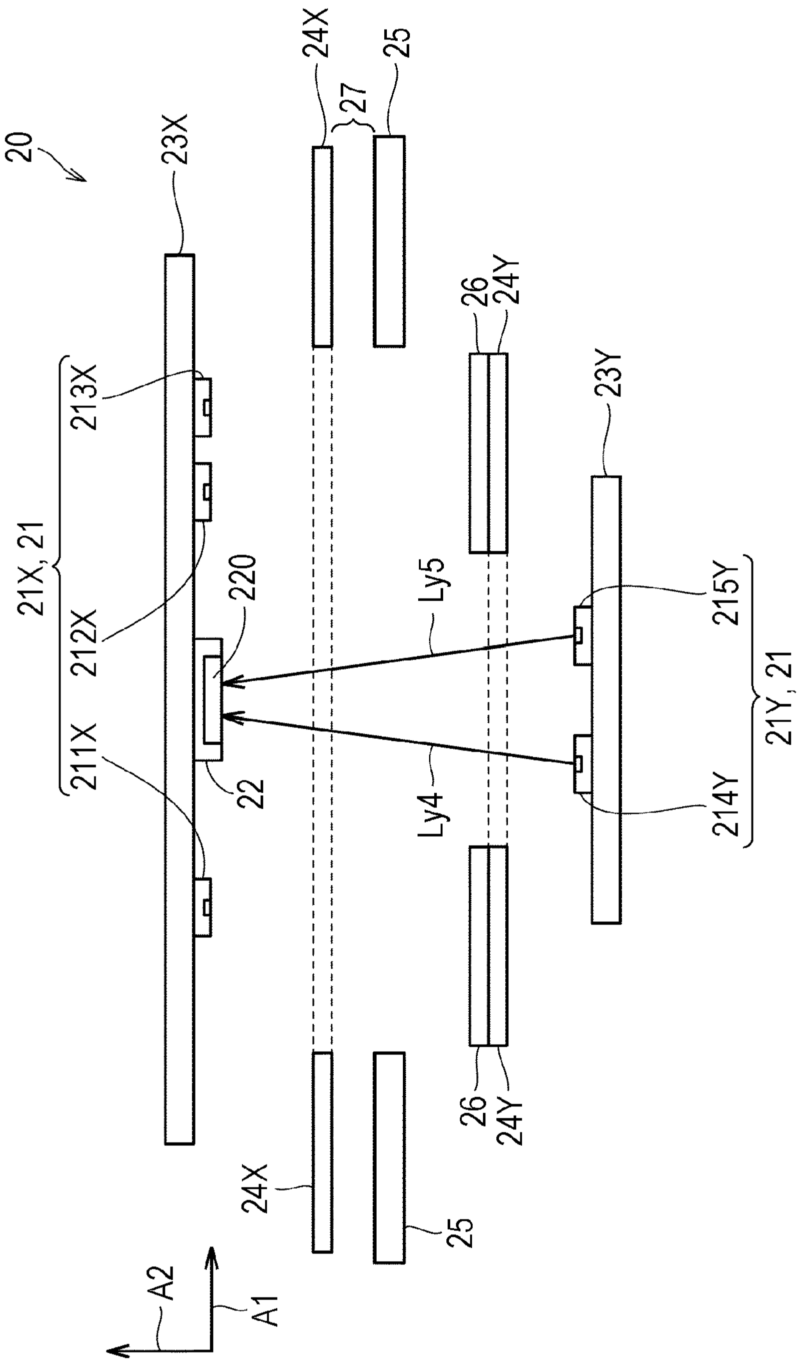
FIG. 7 is a view for explaining light detected by the light receiving element when light is emitted from the second light source unit at a timing when the sheet is not passing through the inspection part.

With reference to FIGS. 6 and 7, detection of transmitted light and calculation of a transmittance will be described. The transmittance is an index used to evaluate transmissivity of the sheet.

FIG. 6 is a view for explaining light detected by the light receiving element 220 when light is emitted from the second light source unit 21Y at a timing when the sheet M is passing through the inspection part 20.

When fourth irradiation light Ly4 having the fourth wavelength is emitted from the fourth light emitting element 214Y at a timing when the sheet M is passing through the inspection part 20, the light receiving element 220 detects transmitted light Lt4 as light from the sheet M. The transmitted light Lt4 includes light transmitted through the sheet M in the fourth irradiation light Ly4. When the sheet M contains a phosphor, the transmitted light Lt4 further includes fluorescence emitted from the phosphor that has absorbed the fourth irradiation light Ly4.

When fifth irradiation light Ly5 having the fifth wavelength is emitted from the fifth light emitting element 215Y at a timing when the sheet M is passing through the inspection part 20, the light receiving element 220 detects transmitted light Lt5 as light from the sheet M. The transmitted light Lt5 includes light transmitted through the sheet M in the fifth irradiation light Ly5. When the sheet M contains a phosphor, the transmitted light Lt5 further includes fluorescence emitted from the phosphor that has absorbed the fifth irradiation light Ly5.

The detection unit 22 acquires a light amount of each of the transmitted light Lt4 and the transmitted light Lt5, and outputs the light amount to the processor 11. The amount of the transmitted light Lt4 acquired by the detection unit 22 is an example of a "fourth detection value" in the present disclosure. The amount of the transmitted light Lt5 acquired by the detection unit 22 is an example of a "fifth detection value" in the present disclosure.

FIG. 7 is a view for explaining light detected by the light receiving element 220 when light is emitted from the second light source unit 21Y at a timing when the sheet M is not passing through the inspection part 20.

When the fourth irradiation light Ly4 having the fourth wavelength is emitted from the fourth light emitting element 214Y at a timing when the sheet M is not passing through the inspection part 20, the light receiving element 220 detects the fourth irradiation light Ly4.

When the fifth irradiation light Ly5 having the fifth wavelength is emitted from the fifth light emitting element 215Y at a timing when the sheet M is not passing through the inspection part 20, the light receiving element 220 detects the fifth irradiation light Ly5.

The detection unit 22 acquires a light amount of each of the fourth irradiation light Ly4 and the fifth irradiation light Ly5, and outputs the light amount to the processor 11. The processor 11 stores a light amount of each of the fourth irradiation light Ly4 and the fifth irradiation light Ly5 into the storage 13. The light amount of each of the fourth irradiation light Ly4 and the fifth irradiation light Ly5 is an example of the reference data 132.

The transmittance in the present disclosure is calculated by the processor 11 by using the following Equation 5.

Transmittance=light amount Lt/light amount Ly (Equation 5)

The light amount Lt in Equation 5 indicates an amount of light detected by the light receiving element 220 when light is emitted from the second light source unit 21Y at a timing when the sheet M is passing through the inspection part 20. Each of the light amount of the transmitted light Lt4 and the light amount of the transmitted light Lt5 is an example of the light amount Lt.

The light amount Ly in Equation 5 indicates an amount of light detected by the light receiving element 220 when light is emitted from the second light source unit 21Y at a timing when the sheet M is not passing through the inspection part 20. Each of the light amount of the fourth irradiation light Ly4 and the light amount of the fifth irradiation light Ly5 is an example of the light amount Ly.

In the following description, a transmittance IRt of light having the fourth wavelength and a transmittance Bt of light having the fifth wavelength are calculated by the processor 11 by using the following Equations 6 and 7.

Transmittance IRt of light having fourth wavelength=(amount of transmitted light Lt4)/(amount of fourth irradiation light Ly4) (Equation 6)

Transmittance Bt of light having fifth wavelength=(amount of transmitted light Lt5)/(amount of fifth irradiation light Ly5) (Equation 7)

<E. Sheet Type Discrimination Processing>

(E1. Sheet Type Discrimination Processing)

Figure 8:
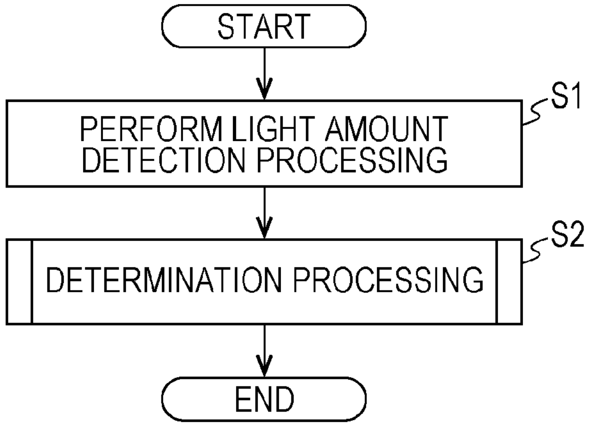
FIG. 8 is a flowchart illustrating a procedure of sheet type discrimination processing in the first embodiment.

With reference to FIG. 8, sheet type discrimination processing in the first embodiment will be described. FIG. 8 is a flowchart illustrating a procedure of the sheet type discrimination processing in the first embodiment. The sheet type discrimination processing includes light amount detection processing by the inspection part 20 and determination processing by the processor 11. The sheet type discrimination processing is started when the sheet M reaches the inspection part 20.

In step S1, the inspection part 20 performs the light amount detection processing. The light amount detection processing includes detecting an amount of the reflected light Lr1, an amount of the reflected light Lr2, an amount of the reflected light Lr3, an amount of the transmitted light Lt4, and an amount of the transmitted light Lt5, and outputting the detected light amounts to the processor 11.

In step S2, the processor 11 performs the determination processing. The determination processing includes calculating a reflectance and a transmittance on the basis of the light amounts acquired from the inspection part 20, and discriminating a sheet type on the basis of the calculated reflectance and transmittance. After step S2, the sheet type discrimination processing ends.

(E2. Determination Processing)

With reference to FIGS. 9 to 12, the determination processing (step S2) will be described. The determination processing includes first processing of discriminating a sheet type on the basis of the reflectance Vr of light having the first wavelength, and second processing of discriminating a sheet type on the basis of the reflectance UVr of light having the second wavelength.

Figure 9:
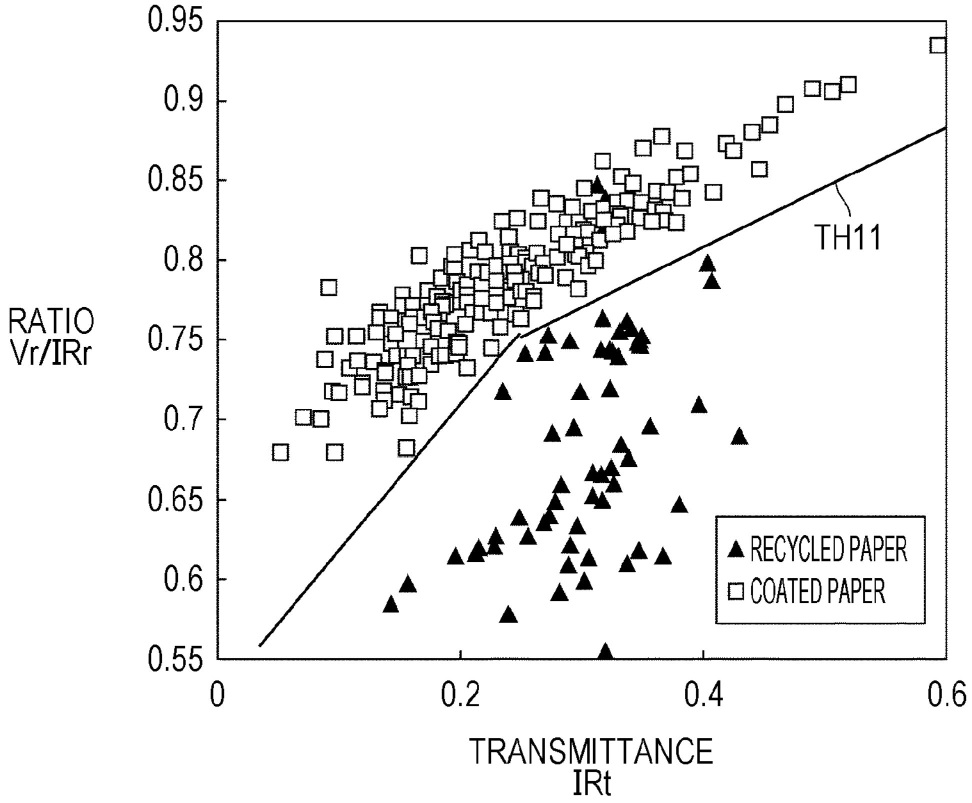
FIG. 9 is a graph for explaining first processing in the first embodiment.

FIG. 9 is a graph for explaining the first processing in the first embodiment. FIG. 9 illustrates results of experiments performed on recycled paper and coated paper of various brands by using the inspection part 20. In the graph of FIG. 9, a horizontal axis represents a transmittance IRt of light having the fourth wavelength, and a vertical axis represents a ratio Vr/IRr. The ratio Vr/IRr indicates a ratio of the reflectance Vr of light having the first wavelength to the reflectance IRr of light having the third wavelength. The transmittance IRt is calculated using Equation 6 described above. The ratio Vr/IRr is calculated using the following Equation 8.

Ratio Vr/IRr=(reflectance Vr of light having first wavelength)/(reflectance IRr of light having third wavelength) (Equation 8)

In the graph of FIG. 9, a triangle mark indicates the ratio Vr/IRr of recycled paper, and a square mark indicates the ratio Vr/IRr of coated paper. As illustrated in FIG. 9, the ratio Vr/IRr is less than a first threshold value TH11 for most recycled paper, and the ratio Vr/IRr is greater than or equal to the first threshold value TH11 for coated paper and some recycled paper.

The reason why the experimental results as illustrated in FIG. 9 are obtained is that waste paper pulp contained in recycled paper easily absorbs light having a peak wavelength of less than 550 nm. Since the reflectance Vr of recycled paper tends to be lower than that of other sheet types due to light absorption by the waste paper pulp, the ratio Vr/IRr is less than the first threshold value TH11 for most recycled paper. Whereas, since a light amount detected by the light receiving element 220 increases by an amount of fluorescence, the reflectance Vr increases even in a case of recycled paper when there is a large amount of phosphor contained in the recycled paper. Therefore, for some recycled paper, the ratio Vr/IRr is greater than or equal to the first threshold value TH11.

Therefore, a sheet type in which the ratio Vr/IRr is less than the first threshold value TH11 can be determined as first-type recycled paper (recycled paper with a small amount of phosphor). Whereas, a sheet type in which the ratio Vr/IRr is greater than or equal to the first threshold value TH11 can be determined as either coated paper or second-type recycled paper (recycled paper with a large amount of phosphor). In the storage 13, the first threshold value TH11 determined in advance by an experiment is stored, and is referred to in the first processing. The first threshold value TH11 is an example of the reference data 132.

In the first processing, the processor 11 calculates the ratio Vr/IRr and the transmittance IRt on the basis of a light amount acquired from the inspection part 20, and determines whether or not the ratio Vr/IRr is greater than or equal to the first threshold value TH11.

More specifically, the processor 11 calculates the reflectance Vr of light having the first wavelength by substituting, into Equation 2, an amount of the reflected light Lr1 acquired from the inspection part 20 and an amount of the reflected light sLr1 stored in the storage 13. The processor 11 calculates the reflectance IRr of light having the third wavelength by substituting, into Equation 4, an amount of the reflected light Lr3 acquired from the inspection part 20 and an amount of the reflected light sLr3 stored in the storage 13. The processor 11 substitutes the reflectance Vr and the reflectance IRr into Equation 8 to calculate the ratio Vr/IRr. The processor 11 calculates the transmittance IRt of light having the fourth wavelength by substituting, into Equation 6, an amount of the transmitted light Lt4 acquired from the inspection part 20 and an amount of the fourth irradiation light Ly4 stored in the storage 13. The processor 11 acquires the first threshold value TH11 corresponding to the transmittance IRt, from the storage 13.

When the ratio Vr/IRr is less than the first threshold value TH11, the processor 11 determines that the sheet type is the first-type recycled paper (recycled paper with a small amount of phosphor). Whereas, when the ratio Vr/IRr is greater than or equal to the first threshold value TH11, the processor 11 further performs the second processing in order to discriminate whether the sheet type is coated paper or the second-type recycled paper (recycled paper with a large amount of phosphor).

Figure 10:
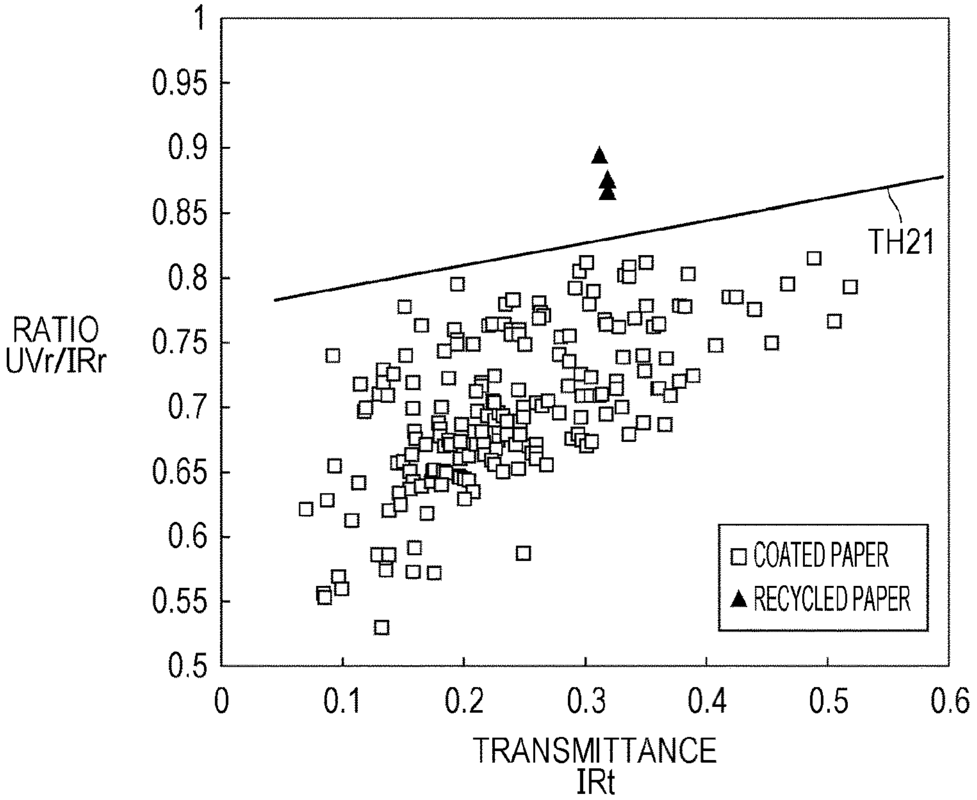
FIG. 10 is a graph for explaining second processing in the first embodiment.

FIG. 10 is a graph for explaining the second processing in the first embodiment. FIG. 10 illustrates results of experiments performed on recycled paper and coated paper of various brands by using the inspection part 20. In the graph of FIG. 10, a horizontal axis represents a transmittance IRt of light having the fourth wavelength, and a vertical axis represents a ratio UVr/IRr. The ratio UVr/IRr indicates a ratio of the reflectance UVr of light having the second wavelength to the reflectance IRr of light having the third wavelength. The transmittance IRt is calculated using Equation 6 described above. The ratio UVr/IRr is calculated using the following Equation 9.

The ratio UVr/IRr=(reflectance UVr of light having second wavelength)/(reflectance IRr of light having third wavelength) (Equation 9)

In the graph of FIG. 10, a triangle mark indicates the ratio UVr/IRr of recycled paper, and a square mark indicates the ratio UVr/IRr of coated paper. As illustrated in FIG. 10, the ratio UVr/IRr is greater than or equal to a second threshold value TH21 for recycled paper, and the ratio UVr/IRr is less than the second threshold value TH21 for coated paper.

Figure 11:
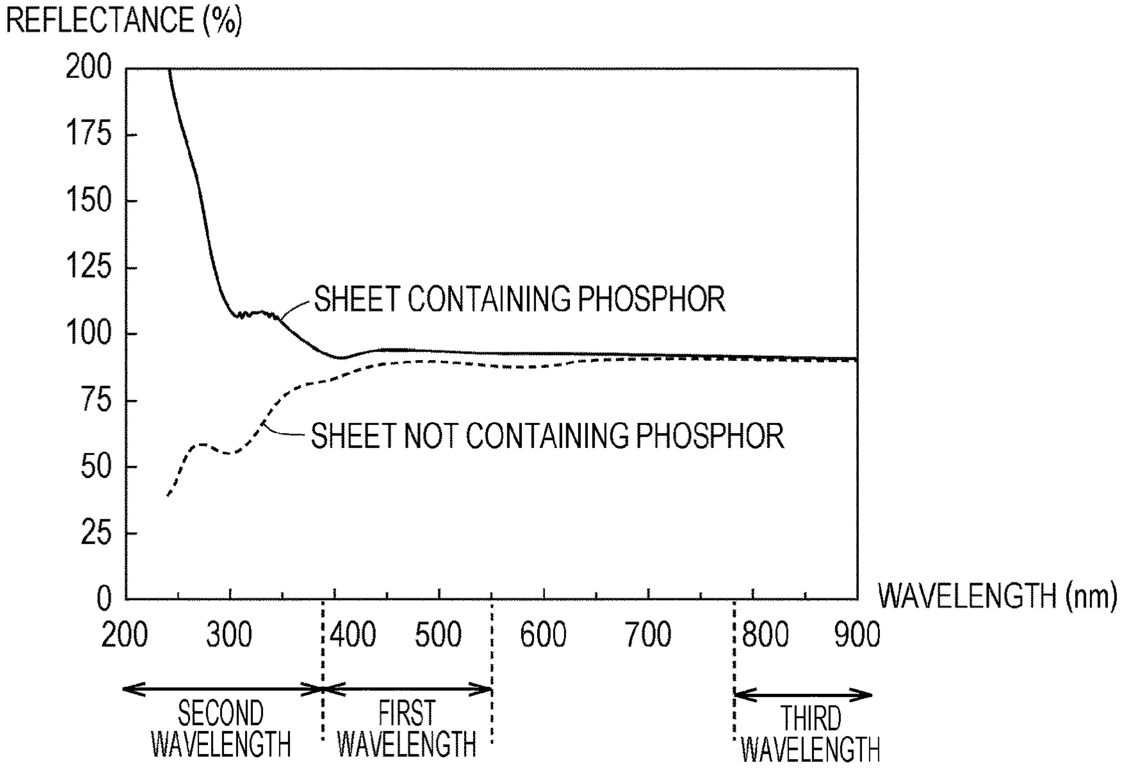
FIG. 11 is a graph illustrating a difference in reflectance between a sheet containing a phosphor and a sheet not containing a phosphor.

Here, the reason why the experimental results as illustrated in FIG. 10 are obtained will be described with reference to FIG. 11. FIG. 11 is a graph illustrating a difference in reflectance between a sheet containing a phosphor and a sheet not containing a phosphor. In the graph of FIG. 11, a horizontal axis represents a wavelength of light applied to a sheet, and a vertical axis represents a reflectance of light.

As illustrated in FIG. 11, the reflectance decreases as the wavelength decreases in the sheet not containing a phosphor, whereas the reflectance increases as the wavelength decreases with a wavelength of about 400 nm as a boundary in the sheet containing a phosphor. This is because the phosphor contained in the sheet absorbs ultraviolet light (light having the second wavelength) and emits light (fluorescence) having a long wavelength that is easily detected by a photodiode, so that an amount of light detected as reflected light apparently increases. Since the detection amount of light increases by an amount of fluorescence, the apparent reflectance UVr of light having the second wavelength increases as an amount of the phosphor contained in the sheet increases.

Referring to FIG. 10 again, a sheet type in which the ratio UVr/IRr is greater than or equal to the second threshold value TH21 can be determined as a sheet type with a large amount of phosphor (in the first embodiment, the second-type recycled paper (recycled paper with a large amount of phosphor)). Whereas, a sheet type in which the ratio UVr/IRr is less than the second threshold value TH21 can be determined as a sheet type with a small amount of phosphor (in the first embodiment, coated paper). In the storage 13, the second threshold value TH21 determined in advance by an experiment is stored, and is referred to in the second processing. The second threshold value TH21 is an example of the reference data 132.

In the second processing, the processor 11 calculates the ratio UVr/IRr on the basis of a light amount acquired from the inspection part 20, and determines whether or not the ratio UVr/IRr is greater than or equal to the second threshold value TH21.

More specifically, the processor 11 calculates the reflectance UVr of light having the second wavelength by substituting, into Equation 3, an amount of the reflected light Lr2 acquired from the inspection part 20 and an amount of the reflected light sLr2 stored in the storage 13. The processor 11 calculates the ratio UVr/IRr by substituting, into Equation 9, the reflectance UVr and the reflectance IRr calculated in the first processing. The processor 11 acquires the second threshold value TH21 corresponding to the transmittance IRt calculated in the first processing, from the storage 13.

When the ratio UVr/IRr is greater than or equal to the second threshold value TH21, the processor 11 determines that the sheet type is the second-type recycled paper (recycled paper with a large amount of phosphor). Whereas, when the ratio UVr/IRr is less than the second threshold value TH21, the processor 11 determines that the sheet type is coated paper.

Figure 12:
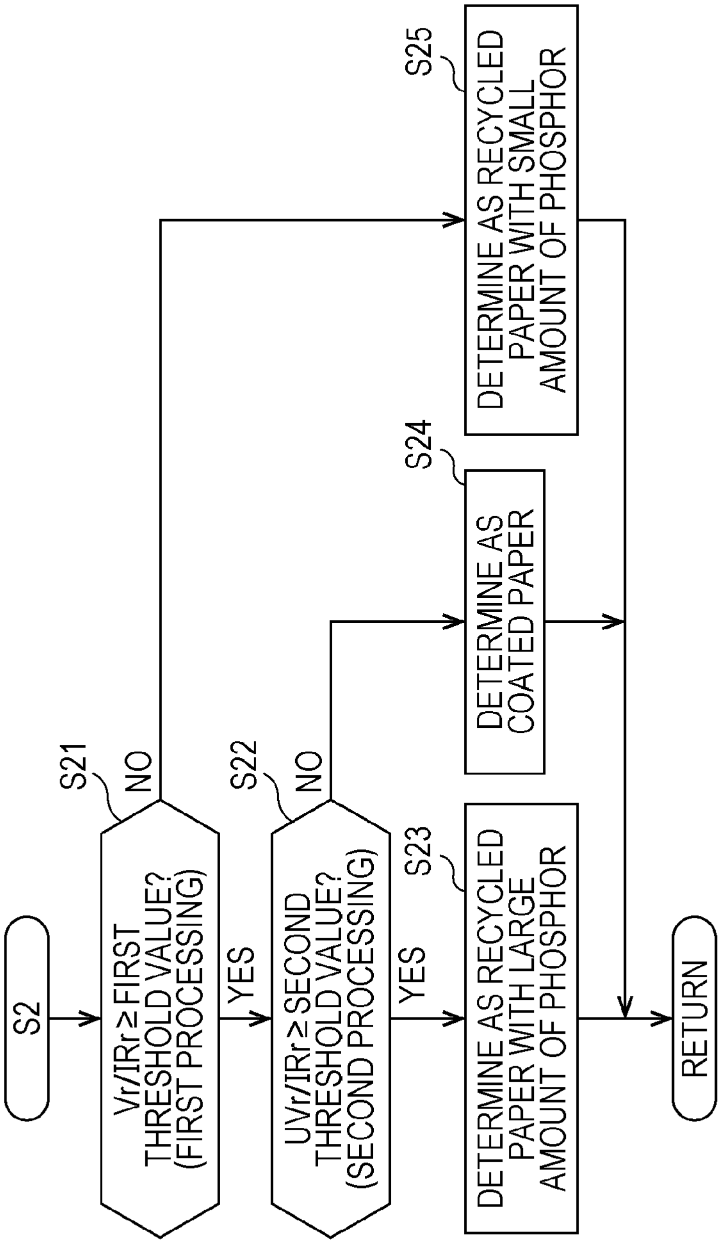
FIG. 12 is a flowchart illustrating a procedure of determination processing in the first embodiment.

FIG. 12 is a flowchart illustrating a procedure of the determination processing in the first embodiment. The determination processing is executed by the processor 11.

In step S21, the processor 11 executes the first processing. The first processing is processing of determining whether or not the ratio Vr/IRr of the reflectance Vr of light having the first wavelength to the reflectance IRr of light having the third wavelength is greater than or equal to the first threshold value TH11 corresponding to the transmittance IRt. By step S21, the first-type recycled paper (recycled paper with a small amount of phosphor) is discriminated.

When the ratio Vr/IRr is greater than or equal to the first threshold value TH11 corresponding to the transmittance IRt (YES in step S21), the processor 11 advances the processing to step S22. Whereas, when the ratio Vr/IRr is less than the first threshold value TH11 corresponding to the transmittance IRt (NO in step S21), the processor 11 advances the processing to step S25.

In step S22, the processor 11 executes the second processing. The second processing is processing of determining whether or not the ratio UVr/IRr of the reflectance UVr of light having the second wavelength to the reflectance IRr of light having the third wavelength is greater than or equal to the second threshold value TH21 corresponding to the transmittance IRt. By step S22, the second-type recycled paper (recycled paper with a large amount of phosphor) and coated paper are discriminated.

When the ratio UVr/IRr is greater than or equal to the second threshold value TH21 corresponding to the transmittance IRt (YES in step S22), the processor 11 advances the processing to step S23. Whereas, when the ratio UVr/IRr is less than the second threshold value TH21 corresponding to the transmittance IRt (NO in step S22), the processor 11 advances the processing to step S24.

In step S23, the processor 11 determines that the sheet type is the second-type recycled paper (recycled paper with a large amount of phosphor). In step S24, the processor 11 determines that the sheet type is coated paper. In step S25, the processor 11 determines that the sheet type is the first-type recycled paper (recycled paper with a small amount of phosphor).

After step S23, step S24, or step S25, the sheet type discrimination processing ends.

As described above, the sheet type discrimination device 2 according to the first embodiment discriminates the first-type recycled paper (recycled paper with a small amount of phosphor) by the first processing using an amount of light (a first detection value) detected as the reflected light Lr1, and discriminates coated paper and the second-type recycled paper (recycled paper with a large amount of phosphor) by the second processing using an amount of light (a second detection value) detected as the reflected light Lr2. Therefore, the recycled paper can be reliably discriminated.

Further, in the first processing, since the ratio of the reflectance Vr to the reflectance IRr is compared with the threshold value instead of comparing the reflectance Vr with the threshold value, a fluctuation of the reflectance Vr caused by a fluctuation of the passing position of the sheet M can be suppressed. Further, in the second processing, since the ratio of the reflectance UVr to the reflectance IRr is compared with the threshold value instead of comparing the reflectance UVr with the threshold value, a fluctuation of the reflectance UVr caused by a fluctuation of the passing position of the sheet M can be suppressed. It is known that the reflectance IRr of light having the third wavelength is less likely to be affected by the sheet type. In general, an amount of light detected by the light receiving element 220 increases when the passing position of the sheet M is close to the light receiving element 220, and an amount of light detected by the light receiving element 220 decreases when the passing position of the sheet M is far from the light receiving element 220. Therefore, the reflectance Vr and the reflectance UVr may fluctuate depending on the passing position of the sheet M. However, in the first processing, since the ratio of the reflectance Vr to the reflectance IRr is compared with the threshold value, a fluctuation of the reflectance Vr caused by a fluctuation of the passing position of the sheet M can be suppressed. Further, in the second processing, since the ratio of the reflectance UVr to the reflectance IRr is compared with the threshold value, a fluctuation of the reflectance UVr caused by a fluctuation of the passing position of the sheet M can be suppressed.

In the first processing, the processor 11 may discriminate the first-type recycled paper (recycled paper with a small amount of phosphor) by comparing the reflectance Vr with a threshold value determined in advance by an experiment.

In the second processing, the processor 11 may discriminate the second-type recycled paper (recycled paper with a large amount of phosphor) by comparing the reflectance UVr with a threshold value determined in advance by an experiment.

Further, as described above, a peak wavelength of the light having the first wavelength is merely required to be 390 nm or more and less than 550 nm. However, by adopting light having a peak wavelength of 390 nm or more and less than 440 nm (that is, ultraviolet light) as the light having the first wavelength, discrimination accuracy of the sheet type by the first processing is enhanced. This is because the wavelength of 390 nm or more and less than 440 nm is a wavelength at which a phosphor contained in a sheet does not absorb much light, and is a wavelength at which waste paper pulp absorbs much light, so that a difference in the reflectance Vr is likely to occur between the case where the sheet type is the first-type recycled paper (recycled paper with a small amount of phosphor) and other cases.

In addition, as described above, the light having the second wavelength is merely required to be ultraviolet light. However, by adopting light having a peak wavelength of 340 nm or more and less than 390 nm as the light having the second wavelength, discrimination accuracy of the sheet type by the second processing is enhanced. This is because the wavelength of 340 nm or more and less than 390 nm is a wavelength at which a phosphor contained in a sheet absorbs much light, so that a difference in the reflectance UVr is likely to occur between a sheet type with a large amount of phosphor (in the first embodiment, the second-type recycled paper (recycled paper with a large amount of phosphor)) and other sheet types.

Modification of First Embodiment

As the second processing, the processor 11 may discriminate the second-type recycled paper (recycled paper with a large amount of phosphor) and coated paper on the basis of a difference between a ratio of the reflectance Vr of light having the first wavelength to the reflectance IRr of light having the third wavelength and a ratio of the reflectance UVr of light having the second wavelength to the reflectance IRr of light having the third wavelength.

Figure 13:
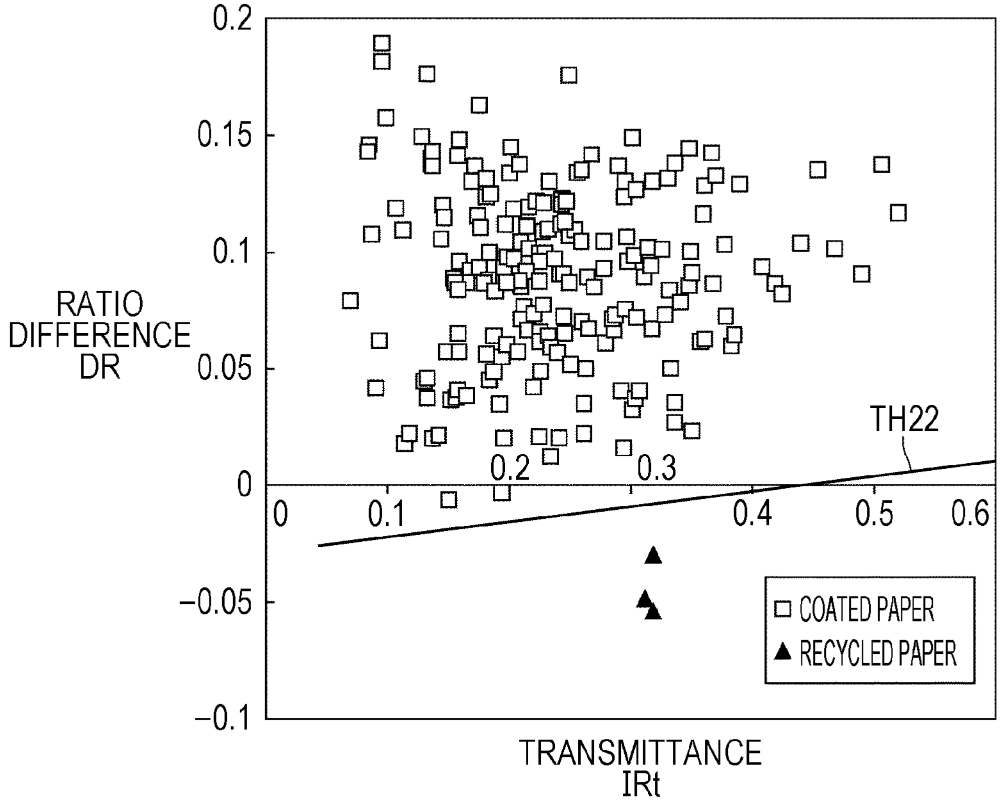
FIG. 13 is a graph for explaining second processing in a modification of the first embodiment.

FIG. 13 is a graph for explaining second processing in a modification of the first embodiment. FIG. 13 illustrates results of experiments performed on recycled paper and coated paper of various brands by using the inspection part 20. In the graph of FIG. 13, a horizontal axis represents a transmittance IRt of light having the fourth wavelength, and a vertical axis represents a ratio difference DR. The ratio difference DR indicates a difference between a ratio of the reflectance Vr of light having the first wavelength to the reflectance IRr of light having the third wavelength and a ratio of the reflectance UVr of light having the second wavelength to the reflectance IRr of light having the third wavelength. The transmittance IRt is calculated using Equation 6 described above. The ratio difference DR is calculated using the following Equation 10.

$$\text{Ratio difference DR}=(\text{ratio Vr/IRr})-(\text{ratio UVr/IRr}) \quad \text{(Equation 10)}$$

In the graph of FIG. 13, a triangle mark indicates the ratio difference DR of recycled paper, and a square mark indicates the ratio difference DR of coated paper. As illustrated in FIG. 13, the ratio difference DR is greater than or equal to a second threshold value TH22 for coated paper, and the ratio difference DR is less than the second threshold value TH22 for recycled paper.

The reason why the experimental results as illustrated in FIG. 13 are obtained is because a phosphor contained in a sheet absorbs ultraviolet light (light having the second wavelength) and emits light (fluorescence) having a long wavelength that is easily detected by a photodiode, so that an amount of light detected as reflected light apparently increases. Since the detection amount of light increases by an amount of fluorescence, the apparent reflectance UVr of light having the second wavelength tends to increase as an amount of the phosphor contained in the sheet increases. Therefore, the sheet type with a large amount of phosphor has the ratio difference DR less than the second threshold value TH22.

Therefore, a sheet type in which the ratio difference DR is less than the second threshold value TH22 can be determined as a sheet type with a large amount of phosphor (in the modification of the first embodiment, the second-type recycled paper (recycled paper with a large amount of phosphor)). In the storage 13, the second threshold value TH22 determined in advance by an experiment is stored, and is referred to in the second processing. The second threshold value TH22 is an example of the reference data 132.

In the second processing, the processor 11 calculates the ratio difference DR, and determines whether the ratio difference DR is greater than or equal to the second threshold value TH22.

More specifically, the processor 11 calculates the ratio Vr/IRr and the ratio UVr/IRr by the method described above, and substitutes the ratio Vr/IRr and the ratio UVr/IRr into Equation 10 to calculate the ratio difference DR. The processor 11 acquires the second threshold value TH22 corresponding to the transmittance IRt calculated in the first processing, from the storage 13.

When the ratio difference DR is greater than or equal to the second threshold value TH22, the processor 11 determines that the sheet type is coated paper. Whereas, when the ratio difference DR is less than the second threshold value TH22, the processor 11 determines that the sheet type is the second-type recycled paper (recycled paper with a large amount of phosphor).

As described above, in the second processing, since the sheet type is discriminated in consideration of not only the reflectance UVr of light having the second wavelength but also the reflectance Vr of light having the first wavelength, discrimination accuracy of the sheet type is further improved.

Further, instead of comparing the difference between the reflectance Vr and the reflectance UVr with the threshold value, a difference between the ratio of the reflectance Vr to the reflectance IRr and the ratio of the reflectance UVr to the reflectance IRr is compared with the threshold value. Therefore, a fluctuation of the reflectance Vr and a fluctuation of the reflectance UVr caused by a fluctuation of the passing position of the sheet M can be suppressed.

In the second processing, the processor 11 may discriminate the second-type recycled paper (recycled paper with a large amount of phosphor) by comparing a difference between the reflectance Vr and the reflectance UVr with a threshold value determined in advance by an experiment.

Second Embodiment

In the first embodiment, a description has been made on a case of discriminating the first-type recycled paper (recycled paper with a small amount of phosphor), the second-type recycled paper (recycled paper with a large amount of phosphor), and the coated paper. In the second embodiment, a description will be made on a case of discriminating first-type recycled paper (recycled paper with a small amount of phosphor), second-type recycled paper (recycled paper with a large amount of phosphor), coated paper, and plain paper. Since an image forming apparatus in the second embodiment is similar to the image forming apparatus 1 in the first embodiment, the same components are denoted by the same reference numerals, and a description thereof will not be repeated. In the first embodiment, the second light source unit 21Y may not include the fifth light emitting element 215Y. However, in the second embodiment, the second light source unit 21Y necessarily includes the fifth light emitting element 215Y.

Since a difference between the second embodiment and the first embodiment is the determination processing, determination processing in the second embodiment will be described here, and a description of other processing will not be repeated. The determination processing in the second embodiment further includes third processing in addition to the above-described first processing and the above-described second processing. The third processing is processing of discriminating plain paper on the basis of a transmittance IRt of light having the fourth wavelength and a transmittance Bt of light having the fifth wavelength.

Figure 14:
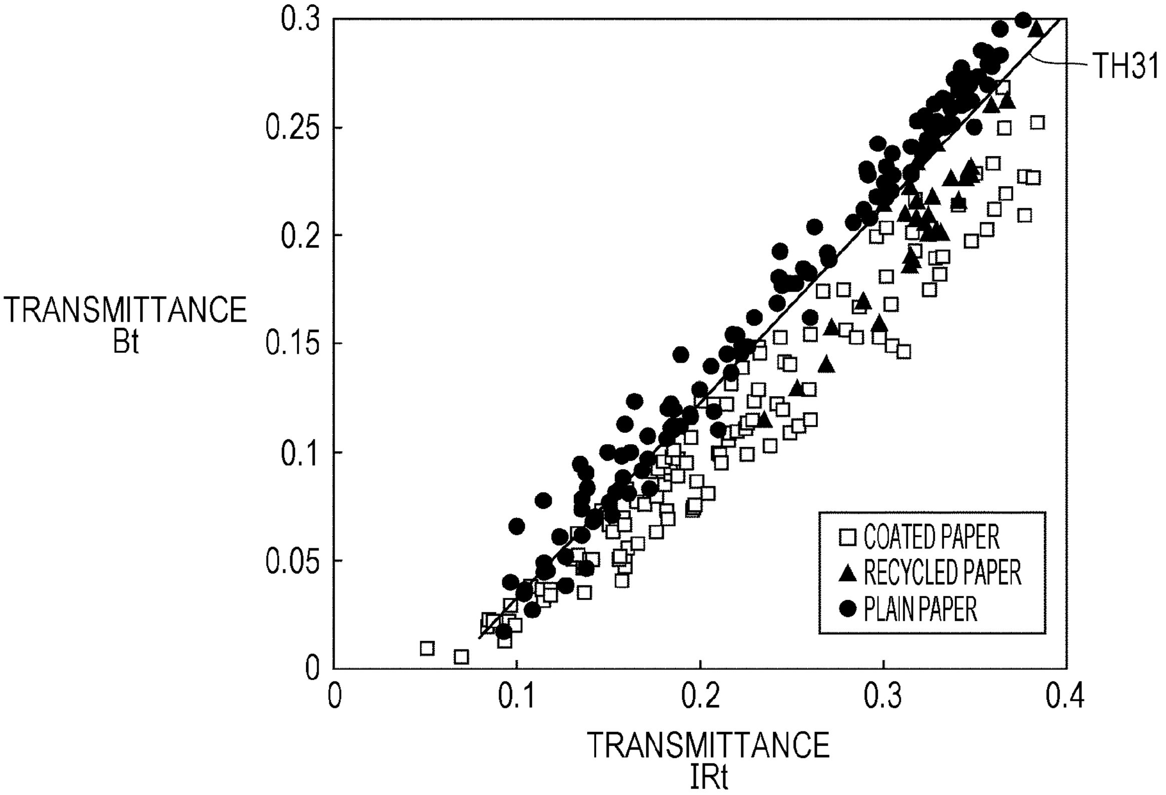
FIG. 14 is a graph for explaining third processing in a second embodiment.

FIG. 14 is a graph for explaining the third processing in the second embodiment. FIG. 14 illustrates results of experiments performed on recycled paper, coated paper, and plain paper of various brands by using the inspection part 20. In the graph of FIG. 14, a horizontal axis represents a transmittance IRt of light having the fourth wavelength, and a vertical axis represents a transmittance Bt of light having the fifth wavelength. The transmittance IRt and the transmittance Bt are calculated using Equations 6 and 7 described above, respectively.

In the graph of FIG. 14, a triangle mark indicates the transmittance Bt of recycled paper, a square mark indicates the transmittance Bt of coated paper, and a circular mark indicates the transmittance Bt of plain paper. As illustrated in FIG. 14, the transmittance Bt is greater than or equal to a third threshold value TH31 for most plain paper, and the transmittance Bt is less than the third threshold value TH31 for most coated paper and most recycled paper.

Therefore, a sheet type in which the transmittance Bt is greater than or equal to the third threshold value TH31 can be determined as plain paper, whereas a sheet type in which the transmittance Bt is less than the third threshold value TH31 can be determined as either coated paper or recycled paper. In the storage 13, the third threshold value TH31 determined in advance by an experiment is stored, and is referred to in the third processing. The third threshold value TH31 is an example of the reference data 132.

In the third processing, the processor 11 calculates the transmittance IRt and the transmittance Bt on the basis of a light amount acquired from the inspection part 20, and determines whether or not the transmittance Bt is greater than or equal to the third threshold value TH31.

More specifically, the processor 11 calculates the transmittance IRt of light having the fourth wavelength by substituting, into Equation 6, an amount of the transmitted light Lt4 acquired from the inspection part 20 and an amount of the fourth irradiation light Ly4 stored in the storage 13. The processor 11 calculates the transmittance Bt of light having the fifth wavelength by substituting, into Equation 7, an amount of the transmitted light Lt5 acquired from the inspection part 20 and an amount of the fifth irradiation light Ly5 stored in the storage 13. The processor 11 acquires the third threshold value TH31 corresponding to the transmittance IRt, from the storage 13.

When the transmittance Bt is greater than or equal to the third threshold value TH31, the processor 11 determines that the sheet type is plain paper. Whereas, when the transmittance Bt is less than the third threshold value TH31, the processor 11 further performs the first processing in order to discriminate whether the sheet type is coated paper or recycled paper. When the sheet type discrimination by the first processing has been failed, that is, when the ratio Vr/IRr is greater than or equal to the first threshold value TH11, the processor 11 further performs the second processing in order to discriminate whether the sheet type is coated paper or the second-type recycled paper (recycled paper with a large amount of phosphor).

Figure 15:
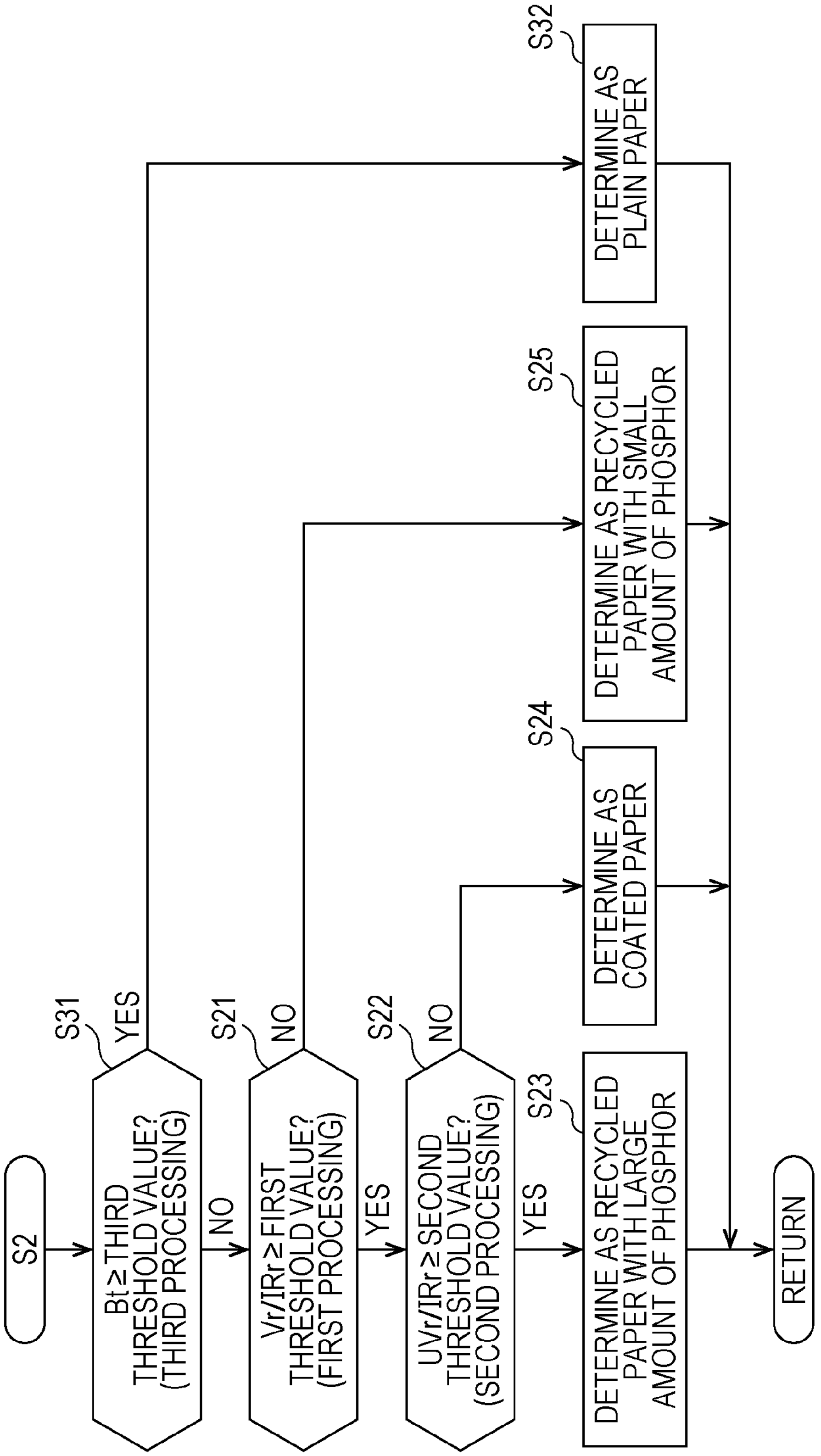
FIG. 15 is a flowchart illustrating a procedure of determination processing in the second embodiment.

FIG. 15 is a flowchart illustrating a procedure of the determination processing in the second embodiment. The determination processing is executed by the processor 11. In the determination processing illustrated in FIG. 15, the processing of step S31 and step S32 is added to the determination processing illustrated in FIG. 12. In the determination processing illustrated in FIG. 15, the same processing as that in the determination processing illustrated in FIG. 12 is denoted by the same step number, and a description thereof will not be repeated.

In step S31, the processor 11 executes the third processing. The third processing is processing of determining whether or not the transmittance Bt is greater than or equal to the third threshold value TH31 corresponding to the transmittance IRt. By step S31, plain paper is discriminated.

When the transmittance Bt is greater than or equal to the third threshold value TH31 corresponding to the transmittance IRt (YES in step S31), the processor 11 advances the processing to step S32. Whereas, when the transmittance Bt is less than the third threshold value TH31 corresponding to the transmittance IRt (NO in step S31), the processor 11 advances the processing to step S21.

In step S32, the processor 11 determines that the sheet type is plain paper. After step S23, step S24, step S25, or step S32, the sheet type discrimination processing ends.

As described above, the sheet type discrimination device 2 according to the second embodiment discriminates the first-type recycled paper (recycled paper with a small amount of phosphor) by the first processing using an amount of light (a first detection value) detected as the reflected light Lr1, and discriminates coated paper and the second-type recycled paper (recycled paper with a large amount of phosphor) by the second processing using an amount of light (a second detection value) detected as the reflected light Lr2. Therefore, the recycled paper can be reliably discriminated.

Further, the sheet type discrimination device 2 according to the second embodiment can further discriminate plain paper by the third processing using an amount of the transmitted light Lt4 (a fourth detection value) and an amount of the transmitted light Lt5 (a fifth detection value).

Modification of Second Embodiment

In the determination processing illustrated in FIG. 15, the third processing, the first processing, and the second processing are performed in this order, but the first processing, the third processing, and the second processing may be performed in this order.

Figure 16:
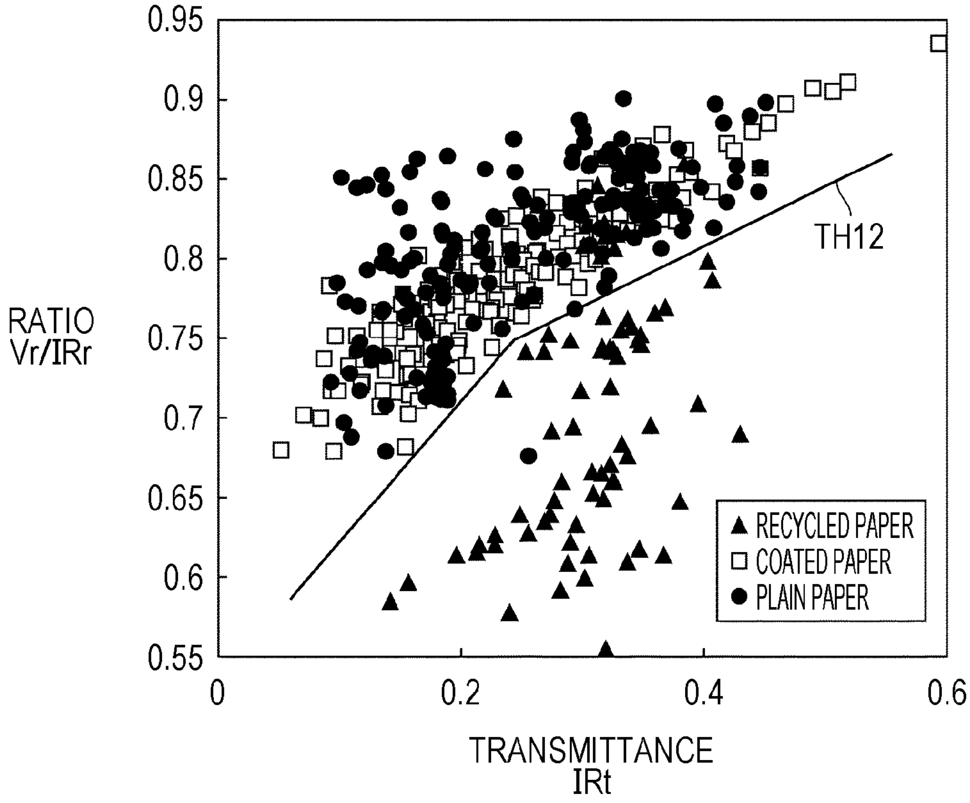
FIG. 16 is a graph for explaining first processing in a modification of the second embodiment.

FIG. 16 is a graph for explaining first processing in a modification of the second embodiment. FIG. 16 illustrates results of experiments performed on recycled paper, coated paper, and plain paper of various brands by using the inspection part 20. In the graph of FIG. 16, a horizontal axis represents a transmittance IRt of light having the fourth wavelength, and a vertical axis represents a ratio (ratio Vr/IRr) of a reflectance Vr of light having the first wavelength to a reflectance IRr of light having the third wavelength. The transmittance IRt is calculated using Equation 6 described above. The ratio Vr/IRr is calculated using Equation 8 described above.

In the graph of FIG. 16, a triangle mark indicates the ratio Vr/IRr of recycled paper, a square mark indicates the ratio Vr/IRr of coated paper, and a circular mark indicates the ratio Vr/IRr of plain paper. As illustrated in FIG. 16, the ratio Vr/IRr is less than a first threshold value TH12 for most recycled paper, and the ratio Vr/IRr is greater than or equal to the first threshold value TH12 for most coated paper, most plain paper, and some recycled paper.

The reason why the experimental results as illustrated in FIG. 16 are obtained is the same as the reason why the experimental results as illustrated in FIG. 9 are obtained.

Therefore, a sheet type in which the ratio Vr/IRr is less than the first threshold value TH12 can be determined as the first-type recycled paper (recycled paper with a small amount of phosphor). Whereas, a sheet type in which the ratio Vr/IRr is greater than or equal to the first threshold value TH12 can be determined as any of coated paper, plain paper, and the second-type recycled paper (recycled paper with a large amount of phosphor). In the storage 13, the first threshold value TH12 determined in advance by an experiment is stored, and is referred to in the first processing. The first threshold value TH12 is an example of the reference data 132.

In the first processing, the processor 11 calculates the ratio Vr/IRr and the transmittance IRt by the method described above on the basis of a light amount acquired from the inspection part 20, and determines whether or not the ratio Vr/IRr is greater than or equal to the first threshold value TH12. More specifically, the processor 11 acquires the first threshold value TH12 corresponding to the transmittance IRt from the storage 13, and determines whether or not the ratio Vr/IRr is greater than or equal to the first threshold value TH12.

When the ratio Vr/IRr is less than the first threshold value TH12, the processor 11 determines that the sheet type is the first-type recycled paper (recycled paper with a small amount of phosphor). Whereas, when the ratio Vr/IRr is greater than or equal to the first threshold value TH12, the processor 11 further performs the third processing in order to discriminate whether the sheet type is coated paper, plain paper, or the second-type recycled paper (recycled paper with a large amount of phosphor). When the sheet type discrimination by the third processing has been failed, that is, when the transmittance Bt is less than the third threshold value TH31, the processor 11 further performs the second processing in order to discriminate whether the sheet type is coated paper or the second-type recycled paper (recycled paper with a large amount of phosphor).

Figure 17:
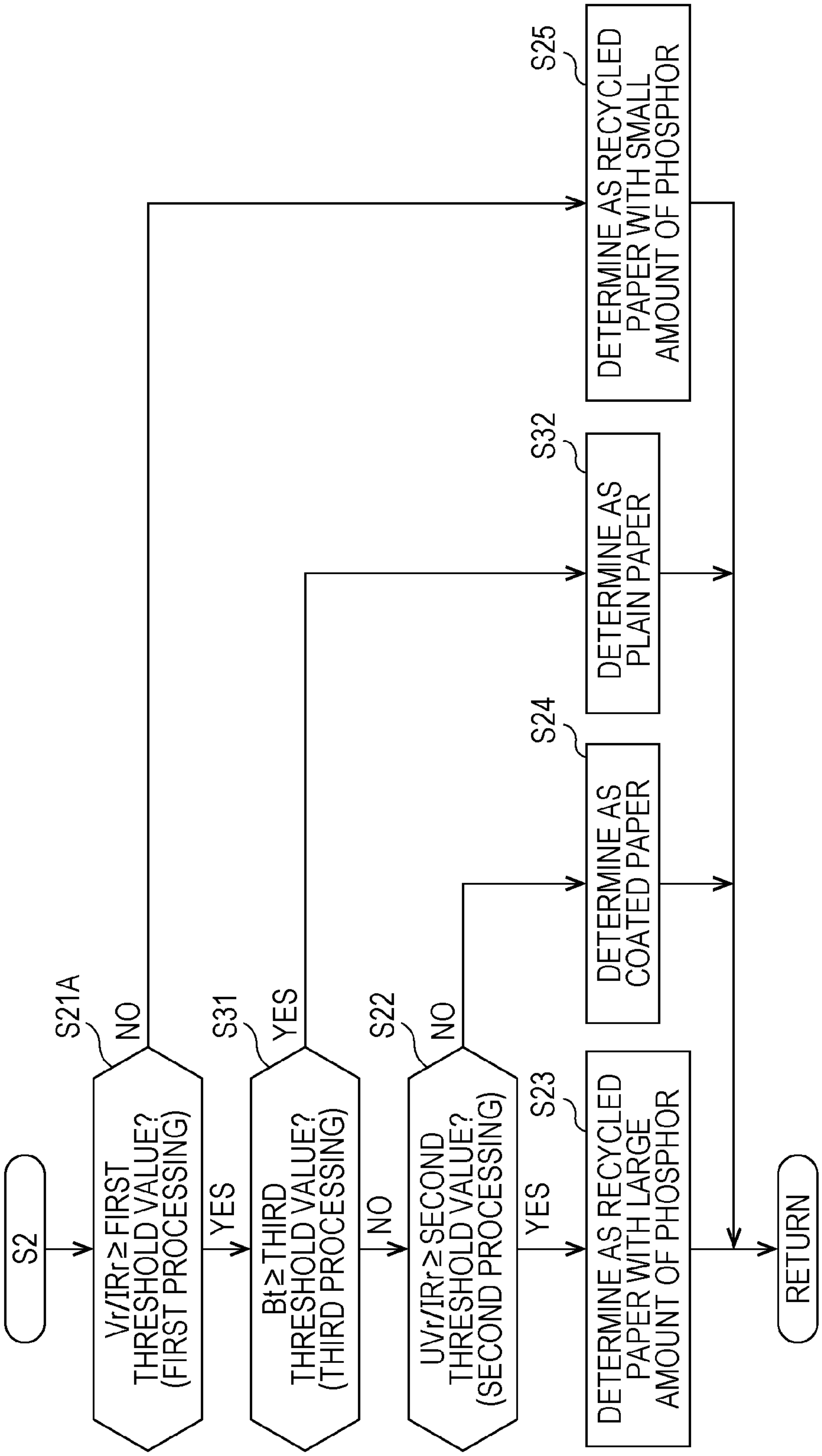
FIG. 17 is a flowchart illustrating a procedure of determination processing in the modification of the second embodiment.

FIG. 17 is a flowchart illustrating a procedure of determination processing according to the modification of the second embodiment. The determination processing is executed by the processor 11. An order in which the first processing, the second processing, and the third processing are performed is different between the determination processing illustrated in FIG. 17 and the determination processing illustrated in FIG. 15. In the determination processing illustrated in FIG. 17, the first processing, the third processing, and the second processing are performed in this order. Further, in the determination processing illustrated in FIG. 17, as the first processing, step S21A is performed instead of step S21. In the determination processing illustrated in FIG. 17, the same processing as that in the determination processing illustrated in FIG. 15 is denoted by the same step number, and a description thereof will not be repeated.

In step S21A, the processor 11 executes the first processing. The first processing is processing of determining whether or not the ratio Vr/IRr of the reflectance Vr of light having the first wavelength to the reflectance IRr of light having the third wavelength is greater than or equal to the first threshold value TH12 corresponding to the transmittance IRt. By step S21A, the first-type recycled paper (recycled paper with a small amount of phosphor) is discriminated.

When the ratio Vr/IRr is greater than or equal to the first threshold value TH12 corresponding to the transmittance IRt (YES in step S21A), the processor 11 advances the processing to step S31. Whereas, when the ratio Vr/IRr is less than the first threshold value TH12 corresponding to the transmittance IRt (NO in step S21A), the processor 11 advances the processing to step S25.

After step S23, step S24, step S25, or step S32, the sheet type discrimination processing ends.

As described above, the sheet type discrimination device 2 according to the modification of the second embodiment also discriminates the first-type recycled paper (recycled paper with a small amount of phosphor) by the first processing, and discriminates coated paper and the second-type recycled paper (recycled paper with a large amount of phosphor) by the second processing. Therefore, the recycled paper can be reliably discriminated.

Further, the sheet type discrimination device 2 according to the modification of the second embodiment can further discriminate plain paper by the third processing.

Third Embodiment

In the second embodiment, a description has been made on a case of discriminating the first-type recycled paper (recycled paper with a small amount of phosphor), the second-type recycled paper (recycled paper with a large amount of phosphor), coated paper, and plain paper. In a third embodiment, a description will be made on a case of discriminating the first-type recycled paper (recycled paper with a small amount of phosphor), the second-type recycled paper (recycled paper with a large amount phosphor), coated paper, plain paper with a small amount of phosphor, and plain paper with a large amount of phosphor. Since an image forming apparatus in the third embodiment is similar to the image forming apparatus 1 in the second embodiment, the same components are denoted by the same reference numerals, and a description thereof will not be repeated.

Since a difference between the third embodiment and the second embodiment is the determination processing, determination processing in the third embodiment will be described here, and a description of other processing will not be repeated. The determination processing in the third embodiment also includes first processing, second processing, and third processing. However, an execution order and the number of times of execution of the first processing, the second processing, and the third processing are different between the determination processing in the third embodiment and the determination processing in the second embodiment.

Figure 18:
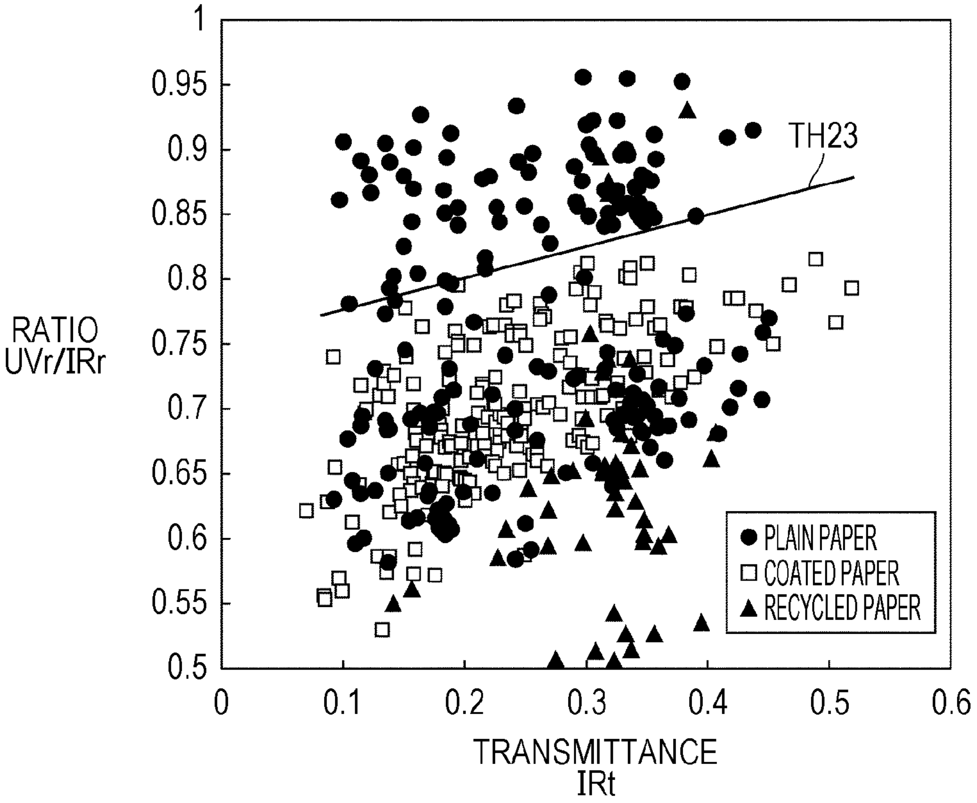
FIG. 18 is a graph for explaining second processing in a third embodiment.

FIG. 18 is a graph for explaining the second processing in the third embodiment. FIG. 18 illustrates results of experiments performed on recycled paper, coated paper, and plain paper of various brands by using the inspection part 20. In the graph of FIG. 18, a horizontal axis represents a transmittance IRt of light having the fourth wavelength, and a vertical axis represents a ratio (ratio UVr/IRr) of a reflectance UVr of light having the second wavelength to a reflectance IRr of light having the third wavelength. The transmittance IRt is calculated using Equation 6 described above. The ratio UVr/IRr is calculated using Equation 9 described above.

In the graph of FIG. 18, a triangle mark indicates the ratio UVr/IRr of recycled paper, a square mark indicates the ratio UVr/IRr of coated paper, and a circular mark indicates the ratio UVr/IRr of plain paper. As illustrated in FIG. 18, for coated paper, the ratio UVr/IRr is less than a second threshold value TH23.

As described above, the apparent reflectance UVr of light having the second wavelength tends to increase as an amount of the phosphor contained in the sheet increases. Therefore, a sheet type in which the ratio UVr/IRr is greater than or equal to the second threshold value TH23 can be determined as a sheet type with a large amount of phosphor (in the third embodiment, the second-type recycled paper (recycled paper with a large amount of phosphor) and plain paper with a large amount of phosphor). Whereas, a sheet type in which the ratio UVr/IRr is less than the second threshold value TH23 can be determined as a sheet type with a small amount of phosphor (in the third embodiment, coated paper, the first-type recycled paper (recycled paper with a small amount of phosphor), and plain paper with a small amount of phosphor). The second threshold value TH23 determined in advance by the experiment is stored in the storage 13, and is referred to in the second processing. The second threshold value TH23 is an example of the reference data 132.

In the second processing, the processor 11 calculates the ratio UVr/IRr by the method described above on the basis of a light amount acquired from the inspection part 20, and determines whether or not the ratio UVr/IRr is greater than or equal to the second threshold value TH23. More specifically, the processor 11 acquires the second threshold value TH23 corresponding to the transmittance IRt from the storage 13, and determines whether or not the ratio UVr/IRr is greater than or equal to the second threshold value TH23.

When the ratio UVr/IRr is greater than or equal to the second threshold value TH23, the processor 11 discriminates that the sheet type is either the second-type recycled paper (recycled paper with a large amount of phosphor) or plain paper with a large amount of phosphor, and further executes the third processing to discriminate between the second-type recycled paper (recycled paper with a large amount of phosphor) and the plain paper with a large amount of phosphor.

Whereas, when the ratio UVr/IRr is less than the second threshold value TH23, the processor 11 determines that the sheet type is any of the first-type recycled paper (recycled paper with a small amount of phosphor), coated paper, and plain paper with a small amount of phosphor, and further executes the first processing. When the sheet type discrimination by the first processing has been failed, that is, when the ratio Vr/IRr is greater than or equal to the first threshold value TH11, the processor 11 further performs the third processing in order to discriminate whether the sheet type is coated paper or plain paper with a small amount of phosphor.

Figure 19:
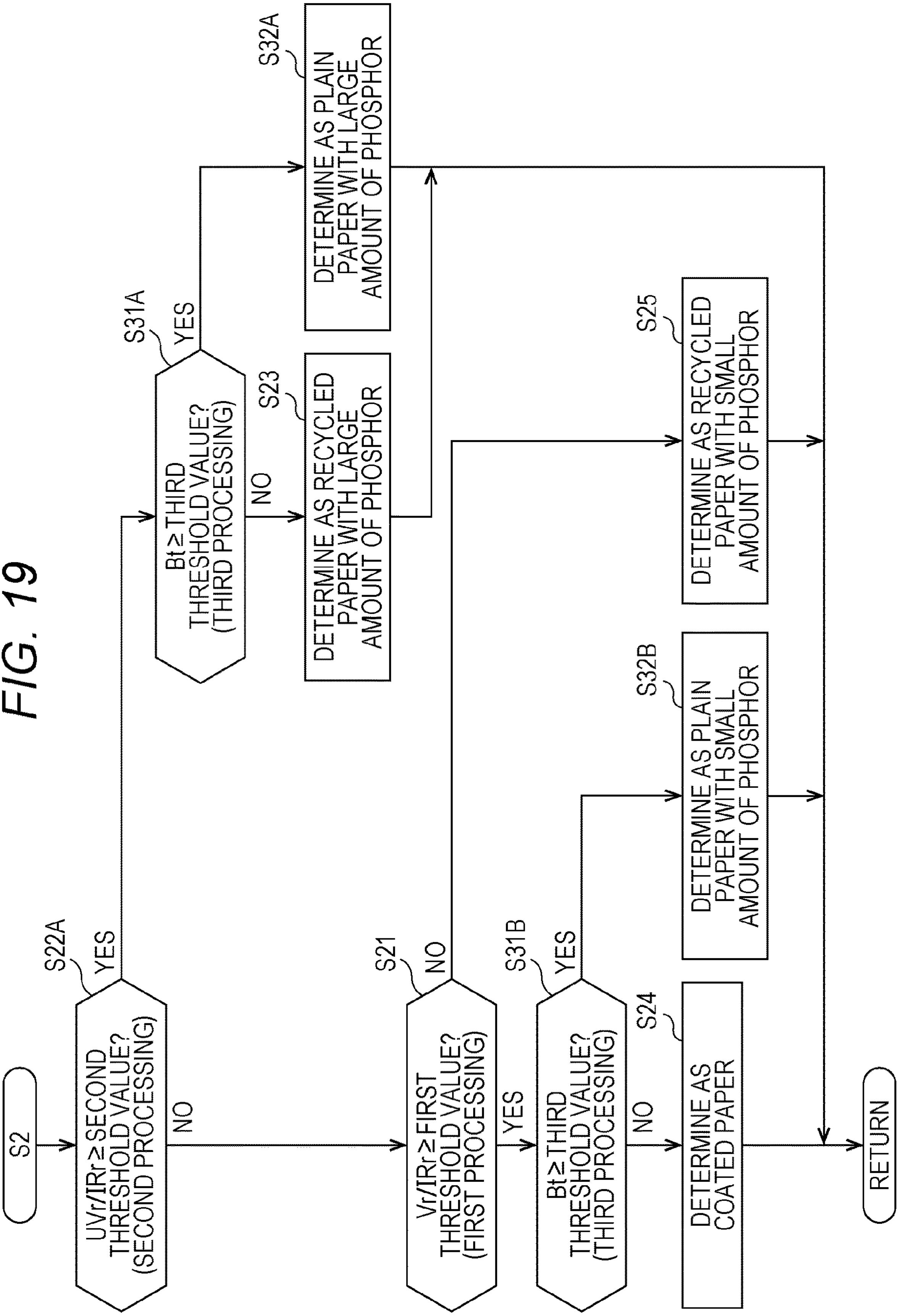
FIG. 19 is a flowchart illustrating a procedure of determination processing in the third embodiment.

FIG. 19 is a flowchart illustrating a procedure of the determination processing in the third embodiment. The determination processing is executed by the processor 11. An execution order and the number of times of execution of the first processing, the second processing, and the third processing are different between the determination processing illustrated in FIG. 19 and the determination processing illustrated in FIG. 15. Further, in the determination processing illustrated in FIG. 19, step S22A is performed instead of step S22 as the second processing, and step S31A and step S31B are performed instead of step S31 as the third processing. In the determination processing illustrated in FIG. 19, the same processing as that in the determination processing illustrated in FIG. 15 is denoted by the same step number, and a description thereof will not be repeated.

In step S22A, the processor 11 executes the second processing. The second processing is processing of determining whether or not the ratio UVr/IRr of the reflectance UVr of light having the second wavelength to the reflectance IRr of light having the third wavelength is greater than or equal to the second threshold value TH23 corresponding to the transmittance IRt. By step S22A, a sheet with a large amount of phosphor and a sheet with a small amount of phosphor are discriminated.

When the ratio UVr/IRr is greater than or equal to the second threshold value TH23 corresponding to the transmittance IRt (YES in step S22A), the processor 11 advances the processing to step S31A. Whereas, when the ratio UVr/IRr is less than the second threshold value TH23 corresponding to the transmittance IRt (NO in step S22A), the processor 11 advances the processing to step S21.

In step S31A, the processor 11 executes the third processing. The third processing is processing of determining whether or not the transmittance Bt is greater than or equal to the third threshold value TH31 corresponding to the transmittance IRt. By step S31A, plain paper and a sheet type other than the plain paper are discriminated.

When the transmittance Bt is greater than or equal to the third threshold value TH31 corresponding to the transmittance IRt (YES in step S31A), the processor 11 advances the processing to step S32A. Whereas, when the transmittance Bt is less than the third threshold value TH31 corresponding to the transmittance IRt (NO in step S31A), the processor 11 advances the processing to step S23.

When the ratio Vr/IRr is greater than or equal to the first threshold value TH11 corresponding to the transmittance IRt (YES in step S21), the processor 11 advances the processing to step S31B.

In step S31B, the processor 11 executes the third processing. The third processing is processing of determining whether or not the transmittance Bt is greater than or equal to the third threshold value TH31 corresponding to the transmittance IRt. By step S31B, plain paper and a sheet type other than the plain paper are discriminated.

When the transmittance Bt is greater than or equal to the third threshold value TH31 corresponding to the transmittance IRt (YES in step S31B), the processor 11 advances the processing to step S32B. Whereas, when the transmittance Bt is less than the third threshold value TH31 corresponding to the transmittance IRt (NO in step S31B), the processor 11 advances the processing to step S24.

In step S32A, the processor 11 determines that the sheet type is plain paper with a large amount of phosphor. In step S32B, the processor 11 determines that the sheet type is plain paper with a small amount of phosphor.

After step S23, step S24, step S25, step S32A, or step S32B, the sheet type discrimination processing ends.

As described above, the sheet type discrimination device 2 in the third embodiment discriminates between the second-type recycled paper (recycled paper with a large amount of phosphor) and plain paper with a large amount of phosphor, by the second processing and the third processing. Further, the sheet type discrimination device 2 in the third embodiment discriminates the first-type recycled paper (recycled paper with a small amount of phosphor) by the second processing and the first processing. Moreover, the sheet type discrimination device 2 in the third embodiment discriminates coated paper and plain paper with a small amount of phosphor, by the second processing, the first processing, and the third processing. Therefore, the recycled paper can be reliably discriminated.

Modification of Third Embodiment

As the second processing, the processor 11 may discriminate a sheet with a large amount of phosphor, on the basis of a difference between a ratio of the reflectance Vr of light having the first wavelength to the reflectance IRr of light having the third wavelength and a ratio of the reflectance UVr of light having the second wavelength to the reflectance IRr of light having the third wavelength.

Figure 20:
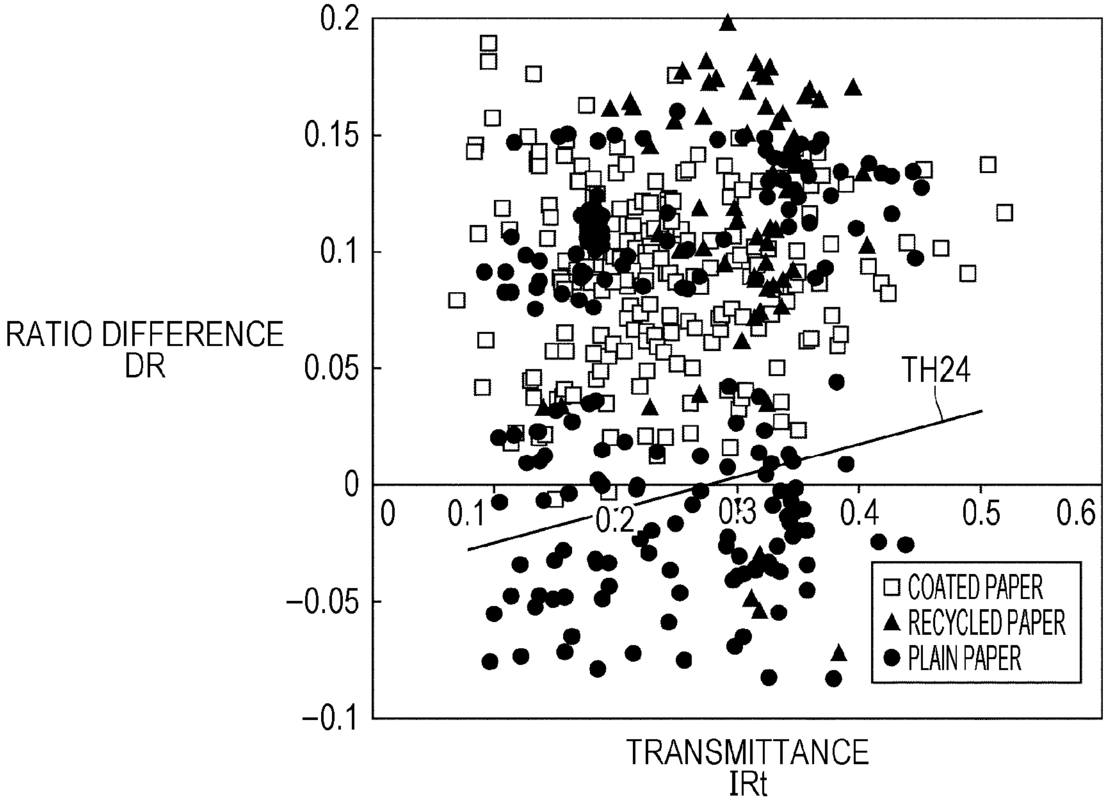
FIG. 20 is a graph for explaining second processing in a modification of the third embodiment.

FIG. 20 is a diagram for explaining second processing in a modification of the third embodiment. FIG. 20 illustrates results of experiments performed on recycled paper, coated paper, and plain paper of various brands by using the inspection part 20. In the graph of FIG. 20, a horizontal axis represents a transmittance IRt of light having the fourth wavelength, and a vertical axis represents a difference (ratio difference DR) between a ratio of a reflectance Vr of light having the first wavelength to a reflectance IRr of light having the third wavelength and a ratio of a reflectance UVr of light having the second wavelength to the reflectance IRr of light having the third wavelength. The transmittance IRt is calculated using Equation 6 described above. The ratio difference DR is calculated using the Equation 10 described above.

In the graph of FIG. 20, a triangle mark indicates the ratio difference DR of recycled paper, a square mark indicates the ratio difference DR of coated paper, and a circular mark indicates the ratio difference DR of plain paper. As illustrated in FIG. 20, for coated paper, the ratio difference DR is greater than or equal to a second threshold value TH24.

As described above, the apparent reflectance UVr of light having the second wavelength tends to increase as an amount of the phosphor contained in the sheet increases. Therefore, a sheet type in which the ratio difference DR is less than the second threshold value TH24 can be determined as a sheet type with a large amount of phosphor (in the modification of the third embodiment, the second-type recycled paper (recycled paper with a large amount of phosphor) and plain paper with a large amount of phosphor). Whereas, a sheet type in which the ratio difference DR is greater than or equal to the second threshold value TH24 can be determined as a sheet type with a small amount of phosphor (in the modification of the third embodiment, coated paper, the first-type recycled paper (recycled paper with a small amount of phosphor), and plain paper with a small amount of phosphor). The second threshold value TH24 determined in advance by the experiment is stored in the storage 13, and is referred to in the second processing. The second threshold value TH24 is an example of the reference data 132.

In the second processing, the processor 11 calculates the ratio difference DR by the method described above on the basis of a light amount acquired from the inspection part 20, and determines whether or not the ratio difference DR is greater than or equal to the second threshold value TH24. More specifically, the processor 11 acquires the second threshold value TH24 corresponding to the transmittance IRt from the storage 13, and determines whether or not the ratio difference DR is greater than or equal to the second threshold value TH24.

When the ratio difference DR is less than the second threshold value TH24, the processor 11 determines that the sheet type is either the second-type recycled paper (recycled paper with a large amount of phosphor) or plain paper with a large amount of phosphor, and further executes the third processing to discriminate between the second-type recycled paper (recycled paper with a large amount of phosphor) and the plain paper with a large amount of phosphor.

Whereas, when the ratio difference DR is greater than or equal to the second threshold value TH24, the processor 11 determines that the sheet type is any of the first-type recycled paper (recycled paper with a small amount of phosphor), coated paper, and plain paper with a small amount of phosphor, and further executes the first processing. When the sheet type discrimination by the first processing has been failed, that is, when the ratio Vr/IRr is greater than or equal to the first threshold value TH11, the processor 11 further performs the third processing in order to discriminate whether the sheet type is coated paper or plain paper with a small amount of phosphor.

Figure 21:
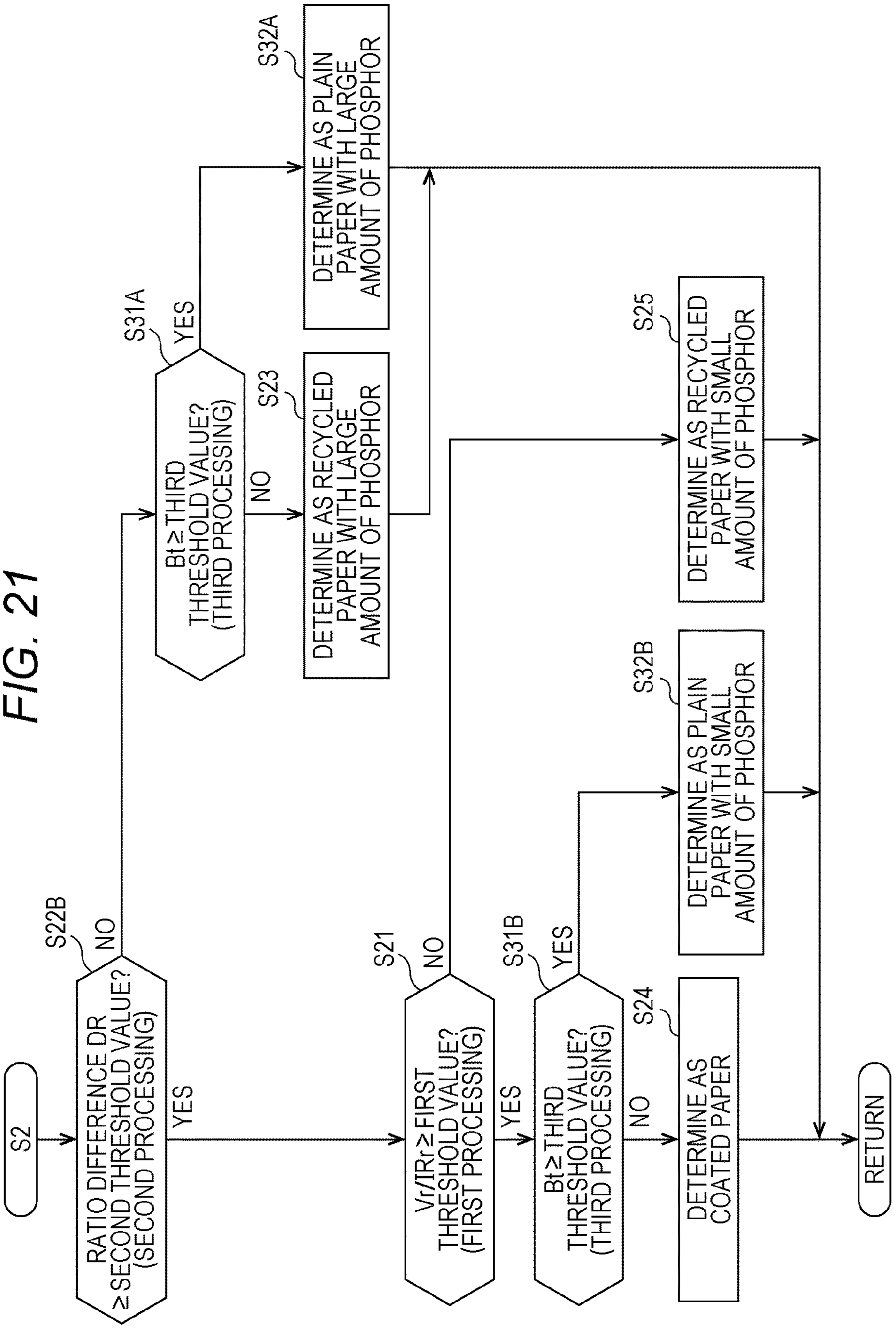
FIG. 21 is a flowchart illustrating a procedure of determination processing in the modification of the third embodiment.

FIG. 21 is a flowchart illustrating a procedure of determination processing in the modification of the third embodiment. The determination processing is executed by the processor 11. In the determination processing illustrated in FIG. 21, as the second processing, step S22B is performed instead of step S22A. In the determination processing illustrated in FIG. 21, the same processing as that in the determination processing illustrated in FIG. 19 is denoted by the same step number, and a description thereof will not be repeated.

In step S22B, the processor 11 executes the second processing. The second processing is processing of determining whether or not the ratio difference DR is greater than or equal to the second threshold value TH24 corresponding to the transmittance IRt. By step S22B, a sheet with a large amount of phosphor and a sheet with a small amount of phosphor are discriminated.

When the ratio difference DR is greater than or equal to the second threshold value TH24 corresponding to the transmittance IRt (YES in step S22B), the processor 11 advances the processing to step S21. Whereas, when the ratio difference DR is less than the second threshold value TH24 corresponding to the transmittance IRt (NO in step S22B), the processor 11 advances the processing to step S31A.

As described above, the sheet type discrimination device 2 in the modification of the third embodiment discriminates between the second-type recycled paper (recycled paper with a large amount of phosphor) and plain paper with a large amount of phosphor, by the second processing and the third processing. Further, the sheet type discrimination device 2 in the third embodiment discriminates the first-type recycled paper (recycled paper with a small amount of phosphor) by the second processing and the first processing.

Moreover, the sheet type discrimination device 2 in the third embodiment discriminates coated paper and plain paper with a small amount of phosphor, by the second processing, the first processing, and the third processing. Therefore, the recycled paper can be reliably discriminated.

Although embodiments of the present invention have been described and illustrated in detail, the disclosed embodiments are made for purposes of illustration and example only and not limitation. The scope of the present invention should be interpreted not by the description above but by terms of the appended claims, and it is intended to include all modifications within the meaning and scope equivalent to the claims.

What is claimed is:

1. A sheet type discrimination device comprising:

a first light source unit that irradiates a sheet with light having a first wavelength and light having a second wavelength;

a detection unit that detects light from the sheet and acquires a detection value based on the light; and a control unit that derives a determination result of a type of the sheet by using the detection value, wherein the first light source unit and the detection unit are located on a same side with respect to the sheet, the detection value includes: a first detection value based on light from the sheet when the sheet is irradiated with light having the first wavelength; and a second detection value based on light from the sheet when the sheet is irradiated with light having the second wavelength, and the control unit discriminates first-type recycled paper by first processing using the first detection value, and discriminates second-type recycled paper different from the first-type recycled paper by second processing using the second detection value.

2. The sheet type discrimination device according to claim 1, wherein the light having the second wavelength is ultraviolet light, the second-type recycled paper contains a larger amount of phosphor than the first-type recycled paper, and the second processing includes discriminating coated paper and the second-type recycled paper by using the second detection value.

3. The sheet type discrimination device according to claim 2, wherein the first light source unit further irradiates the sheet with light having a third wavelength, the detection value further includes a third detection value based on light from the sheet when the sheet is irradiated with light having the third wavelength, and the second processing includes:

calculating a reflectance based on the second detection value;

calculating a reflectance based on the third detection value; and discriminating between coated paper and the second-type recycled paper based on a ratio of a reflectance calculated based on the second detection value to a reflectance calculated based on the third detection value.

4. The sheet type discrimination device according to claim 3, wherein light having the third wavelength is infrared light.

5. The sheet type discrimination device according to claim 1, wherein light having the second wavelength is ultraviolet light, the second-type recycled paper contains a larger amount of phosphor than the first-type recycled paper, and the second processing includes discriminating coated paper and the second-type recycled paper by using the second detection value and the first detection value.

6. The sheet type discrimination device according to claim 5, wherein the first light source unit further irradiates the sheet with light having a third wavelength, the detection value further includes a third detection value based on light from the sheet when the sheet is irradiated with light having the third wavelength, and the second processing includes:

calculating a reflectance based on the first detection value;

calculating a reflectance based on the second detection value;

calculating a reflectance based on the third detection value; and discriminating between coated paper and the second-type recycled paper based on a ratio of a reflectance calculated based on the first detection value to a reflectance calculated based on the third detection value, and based on a ratio of a reflectance calculated based on the second detection value to a reflectance calculated based on the third detection value.

7. The sheet type discrimination device according to claim 6, wherein light having the third wavelength is infrared light.

8. The sheet type discrimination device according to claim 1, wherein light having the first wavelength has a peak wavelength of 390 nm or more and less than 550 nm, the first-type recycled paper contains a smaller amount of phosphor than the second-type recycled paper, and the first processing includes discriminating the first-type recycled paper by using the first detection value.

9. The sheet type discrimination device according to claim 8, wherein the first light source unit further irradiates the sheet with light having a third wavelength, the detection value further includes a third detection value based on light from the sheet when the sheet is irradiated with light having the third wavelength, and the first processing includes:

calculating a reflectance based on the first detection value;

calculating a reflectance based on the third detection value; and discriminating the first-type recycled paper based on a ratio of a reflectance calculated based on the first detection value to a reflectance calculated based on the third detection value.

10. The sheet type discrimination device according to claim 9, wherein light having the third wavelength is infrared light.

11. The sheet type discrimination device according to claim 1, wherein light having the first wavelength has a peak wavelength of 390 nm or more and less than 440 nm, and light having the second wavelength has a peak wavelength of 340 nm or more and less than 390 nm.

12. The sheet type discrimination device according to claim 1, wherein the sheet type discrimination device further includes a second light source unit located on a side opposite to a side where the detection unit is arranged with respect to the sheet, the second light source unit further irradiates the sheet with light having a fourth wavelength and light having a fifth wavelength, the detection value further includes: a fourth detection value based on light from the sheet when the sheet is irradiated with light having the fourth wavelength; and a fifth detection value based on light from the sheet when the sheet is irradiated with light having the fifth wavelength, and the control unit further discriminates plain paper by third processing using the fourth detection value and the fifth detection value.

13. The sheet type discrimination device according to claim 12, wherein light having the fourth wavelength is infrared light, and light having the fifth wavelength is blue light.

* * * * *